(12) United States Patent
Haselhuhn et al.

(10) Patent No.: US 10,730,133 B2
(45) Date of Patent: Aug. 4, 2020

(54) ELECTRODE WELD FACE DESIGN

(71) Applicant: GM GLOBAL TECHNOLOGY OPERATIONS LLC, Detroit, MI (US)

(72) Inventors: Amberlee S. Haselhuhn, Troy, MI (US); David R. Sigler, Shelby Township, MI (US); Blair E. Carlson, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 356 days.

(21) Appl. No.: 15/807,219

(22) Filed: Nov. 8, 2017

(65) Prior Publication Data
US 2019/0134735 A1    May 9, 2019

(51) Int. Cl.
| | | |
|---|---|---|
| *B23K 11/11* | (2006.01) | |
| *B23K 11/30* | (2006.01) | |
| *B23K 35/02* | (2006.01) | |
| *B23B 5/16* | (2006.01) | |
| *B32B 15/01* | (2006.01) | |

(Continued)

(52) U.S. Cl.
CPC ............ *B23K 11/115* (2013.01); *B23B 5/166* (2013.01); *B23K 11/3009* (2013.01); *B23K 11/3063* (2013.01); *B23K 35/0205* (2013.01); *B23K 35/0261* (2013.01); *B32B 15/016* (2013.01); *B23K 11/14* (2013.01); *C22C 21/00* (2013.01)

(58) Field of Classification Search
CPC .............. B23K 11/115; B23K 11/3009; B23K 11/3063; B23K 11/14; B23K 35/0205; B23K 35/0261; B23B 5/166; B32B 15/016; C22C 21/00
USPC .......................................................... 219/119
See application file for complete search history.

(56) References Cited

U.S. PATENT DOCUMENTS

| | | | | |
|---|---|---|---|---|
| 1,052,193 A | * | 2/1913 | Vogt ...................... | B21D 37/20 72/476 |
| 5,155,320 A | | 10/1992 | Simmons | |

(Continued)

OTHER PUBLICATIONS

U.S. Appl. No. 15/616,252 entitled "Multistep Electrode Weld Face Geometry for Weld Bonding Aluminum to Steel," filed Jun. 6, 2017.

(Continued)

*Primary Examiner* — Paul R Durand
*Assistant Examiner* — Andrew P Bainbridge
(74) *Attorney, Agent, or Firm* — Reising Ethington P.C.

(57) ABSTRACT

A welding electrode and a method of using the welding electrode for resistance spot welding are disclosed. The welding electrode includes a body and a weld face. The weld face includes a central dome portion and a shoulder portion that surrounds the central dome portion and extends from an outer circumference of the weld face upwardly and radially inwardly to the central dome portion. The central dome portion has a series of radially-spaced ringed ridges that project outwardly from a base dome face surface. The series of radially-spaced ringed ridges on the central dome portion includes an innermost ringed ridge and an outermost ringed ridge. The outermost ringed ridge on the central dome portion has a radial inner side surface and a radial outer side surface. The radial outer side surface extends below the base dome face surface down to the shoulder portion of the weld face.

20 Claims, 11 Drawing Sheets

(51) Int. Cl.
*B23K 11/14* (2006.01)
*C22C 21/00* (2006.01)

(56) References Cited

U.S. PATENT DOCUMENTS

| | | | | |
|---|---|---|---|---|
| 5,304,769 | A * | 4/1994 | Ikegami | B23K 35/0205 219/119 |
| 8,222,560 | B2 | 7/2012 | Sigler et al. | |
| 8,436,269 | B2 * | 5/2013 | Sigler | B23B 5/166 219/119 |
| 8,525,066 | B2 * | 9/2013 | Sigler | B23K 11/115 219/119 |
| 8,833,215 | B2 | 9/2014 | Sigler et al. | |
| 8,927,894 | B2 | 1/2015 | Sigler et al. | |
| 9,346,118 | B2 | 5/2016 | Sigler et al. | |
| 9,682,439 | B2 | 6/2017 | Sigler et al. | |
| 10,335,892 | B2 * | 7/2019 | Sigler | B23K 11/185 |
| 2007/0212565 | A1 | 9/2007 | Urushihara et al. | |
| 2011/0097594 | A1 | 4/2011 | Tanaka et al. | |
| 2013/0189023 | A1 | 7/2013 | Spinella | |
| 2013/0200048 | A1 | 8/2013 | Sigler et al. | |
| 2013/0306604 | A1 | 11/2013 | Sigler et al. | |
| 2016/0039039 | A1 * | 2/2016 | Edwards, II | B23K 11/3009 219/86.1 |
| 2017/0157697 | A1 | 6/2017 | Yang et al. | |
| 2017/0291246 | A1 * | 10/2017 | Sigler | B23K 11/115 |
| 2017/0291248 | A1 * | 10/2017 | Sigler | B23K 11/20 |
| 2019/0134735 | A1 * | 5/2019 | Haselhuhn | B23K 11/3063 |

OTHER PUBLICATIONS

U.S. Appl. No. 15/418,771 entitled "Welding Electrode Cutting Tool and Method of Using the Same," filed Jan. 29, 2017.
U.S. Appl. No. 15/418,768 entitled "Welding Electrode Cutting Tool and Method of Using the Same," filed Jan. 29, 2017.

* cited by examiner

ELECTRODE WELD FACE DESIGN

INTRODUCTION

Resistance spot welding relies on the momentary passage of an electrical current through overlapping metal workpieces to heat and join the workpieces at a weld location. To carry out such a welding process, two opposed welding electrodes are clamped at aligned spots on opposite sides of the overlapping workpieces and an electrical current is passed through the metal workpieces from one electrode to the other. Resistance to the flow of this electrical current generates heat within the metal workpieces and at their faying interface. The resistively-generated heat is rapidly created and sufficiently concentrated enough to melt one or more of the overlapping metal workpieces. Eventually, upon cooling, the melted portion of the metal workpiece(s) solidifies to join the workpieces together. In practice, resistance spot welding may be employed to fusion weld together similarly-composed metal workpieces including two or more steel workpieces and, more recently, two or more aluminum or aluminum alloy workpieces, and it can also be employed to bond together dissimilar metal workpieces such as a steel workpiece to an aluminum or aluminum alloy workpiece through, essentially, a braze joint.

A number of industries rely on resistance spot welding to join together two or more metal workpieces during the manufacture of a larger assembly. The automotive industry, for example, often uses resistance spot welding to join together metal workpieces during the manufacture of structural frame members (e.g., body sides and cross members) for a vehicle body-in-white (BIW) as well as vehicle closure members (e.g. vehicle doors, hoods, trunk lid, and lift-gates) that are mounted to the BIW, among others. During the programmed welding sequence of these and other components, a variety of workpiece stack-ups may be encountered including stack-ups of two or more steel workpieces, stack-ups of two or more aluminum alloy workpieces, and stack-ups that include a steel workpiece and an adjacent aluminum alloy workpiece, depending on the design of the vehicle. Other industries besides the automotive industry may also wish to resistance spot weld one or more types of workpiece stack-ups in a manufacturing setting. These other industries may include the aerospace, marine, railway, building construction, and industrial equipment industries, to name but a few.

The electrical current that is passed through a particular workpiece stack-up to effectuate joining of the metal workpieces is not delivered indiscriminately. The passage of the electrical current has to be tailored to generate the right amount of heat at the weld location given the compositions and associated properties (e.g., melting points, electrical and thermal conductivities, etc.) of the metal workpieces contained in the stack-up, the thicknesses of the workpieces, the effects of any workpiece surface coatings, and the presence of applied organics such as sealers or adhesives between the workpieces, all the while seeking to minimize thermal damage and other degradation (e.g., contamination) of the welding electrodes. To that end, the electrical current is typically passed through a workpiece stack-up according to a unique weld schedule developed for that particular combination of metal workpieces. The applicable weld schedule is often implemented in conjunction with a specified construction of one or both of the welding electrodes. Consequently, the design of a welding electrode and, in particular, the geometry of the weld face of the electrode, can contribute substantially to the successful joining of certain combinations of metal workpieces.

SUMMARY

A welding electrode according to one embodiment of the present disclosure includes a body and a weld face. The body has a front end and an opposite back end. The weld face is supported on the front end of the body and comprises a central dome portion and a shoulder portion that surrounds the central dome portion and extends from an outer circumference of the weld face upwardly and radially inwardly to the central dome portion. The central dome portion has a base dome face surface and a series of radially-spaced ringed ridges. Each of the series of radially-spaced ringed ridges on the central dome portion projects outwardly from the base dome face surface and surrounds a central axis of the weld face. The series of radially-spaced ringed ridges on the central dome portion includes an innermost ringed ridge that is closest to the central axis of the weld face and an outermost ringed ridge that is farthest from the central axis of the weld face such that the series of radially-spaced ringed ridges on the central dome portion increases in plan diameter from the innermost ringed ridge to the outermost ringed ridge. Moreover, the outermost ringed ridge on the central dome portion has a radial inner side surface and a radial outer side surface. The radial outer side surface of the outermost ringed ridge on the central dome portion extends below the base dome face surface down to the shoulder portion of the weld face.

The welding electrode of the aforementioned embodiment may include additional structure or be further defined. For example, the central dome portion of the weld face may have a plan diameter that ranges from 3 mm to 12 mm, and the base dome face surface may be spherically domed and have a radius of curvature that ranges from 10 mm to 100 mm. In yet another example, each of the series of radially-spaced ringed ridges on the central dome portion may project outwardly from the base dome face surface to a ridge height that ranges from 20 μm to 500 μm. In still another example, the series of radially-spaced ringed ridges on the central dome portion may comprise between two and five ringed ridges. And in still another example, the shoulder portion of the weld face has a base shoulder surface and one or more ringed surface features. Each of the one or more ringed surface features intrudes inwardly into or projects outwardly from the base shoulder surface, respectively, and surrounds the central dome portion of the weld face.

Additionally, the shoulder portion of the welding electrode of the aforementioned embodiment may include a base shoulder surface that is depressed below the base dome face surface of the central dome portion. The base shoulder surface of the shoulder portion may, for example, be depressed below the base dome face surface of the central portion by distance that ranges from 0.05 mm to 1.0 mm. In one implementation, the base shoulder surface may be free of protruding ringed ridges and intruding ringed grooves and extend from the outer circumference of the weld face to the radial outer side surface of the outermost ringed ridge of the central dome portion. The base shoulder surface in that implementation may be spherically rounded and have a radius of curvature that ranges from 10 mm to 100 mm.

In another implementation, the shoulder portion of the welding electrode of the aforementioned embodiment may include a series of radially-spaced ringed ridges positioned between a radial outboard portion of the base shoulder surface located adjacent to the outer circumference of the weld face and a radial inboard portion of the base shoulder surface located adjacent to and contiguous with the radial outer side surface of the outermost ringed ridge of the central dome portion. Each of the series of radially-spaced ringed ridges on the shoulder portion projects outwardly from the base shoulder surface and surrounds the central dome portion. The series of radially-spaced ringed ridges on the shoulder portion may include an innermost ringed ridge that is closest to the central dome portion and an outermost ringed ridge that is farthest from the central dome portion. Moreover, the series of radially-spaced ringed ridges on the shoulder portion may be separated by intervening portions of the base shoulder surface and may increase in plan diameter from the innermost ringed ridge to the outermost ringed ridge on the shoulder portion. Also, in that implementation, each of the series of radially-spaced ringed ridges on the shoulder portion may project outwardly from the base shoulder surface to a ridge height that ranges from 20 µm to 500 µm. The series of radially-spaced ringed ridges on the shoulder portion may comprise between two and six ringed ridges.

In another implementation, the shoulder portion of the welding electrode of the aforementioned embodiment may include a series of radially-spaced ringed grooves. Each of the series of radially-spaced ringed grooves on the shoulder portion intrudes inwardly into the base shoulder surface and surrounds the central dome portion. The series of radially-spaced ringed grooves on the shoulder portion may include an innermost ringed groove that is closest to the central dome portion and an outermost ringed groove that is farthest from the central dome portion. The innermost ringed groove may be adjacent to the central dome portion and be partially defined by the radial outer side surface of the outermost ringed ridge of the central dome portion, and the outermost ringed groove may be adjacent to a radial outboard portion of the base shoulder surface that extends radially inwardly from the outer circumference of the weld face to the outermost ringed groove on the shoulder portion. Moreover, the series of radially-spaced ringed grooves on the shoulder portion may be separated by intervening portions of the base shoulder surface and may increase in plan diameter from the innermost ringed groove to the outermost ringed groove on the shoulder portion. Also, in that implementation, each of the series of radially-spaced ringed grooves on the shoulder portion may intrude inwardly into the base shoulder surface to a groove depth that ranges from 20 µm to 500 µm. The series of radially-spaced ringed grooves on the shoulder portion may comprise between two and six ringed grooves.

In another implementation, the shoulder portion of the welding electrode of the aforementioned embodiment may include a base shoulder surface that is not depressed below the base dome face surface of the central dome portion and may further include a series of radially-spaced ringed grooves. Each of the series of radially-spaced ringed grooves on the shoulder portion intrudes inwardly into the base shoulder surface and surrounds the central dome portion. The series of radially-spaced ringed grooves on the shoulder portion may include an innermost ringed groove that is closest to the central dome portion and an outermost ringed groove that is farthest from the central dome portion. The innermost ringed groove may be adjacent to the central dome portion and be partially defined by the radial outer side surface of the outermost ringed ridge of the central dome portion, and the outermost ringed groove may be adjacent to a radial outboard portion of the base shoulder surface that extends radially inwardly from the outer circumference of the weld face to the outermost ringed groove on the shoulder portion. Moreover, the series of radially-spaced ringed grooves on the shoulder portion may be separated by intervening portions of the base shoulder surface and may increase in plan diameter from the innermost ringed groove to the outermost ringed groove on the shoulder portion. Also, in that implementation, each of the series of radially-spaced ringed grooves on the shoulder portion may intrude inwardly into the base shoulder surface to a groove depth that ranges from 20 µm to 500 µm. The series of radially-spaced ringed grooves on the shoulder portion may comprise between two and six ringed grooves.

A welding electrode according to another embodiment of the present disclosure includes a body and a weld face. The body has a front end and an opposite back end. The weld face is supported on the front end of the body and comprises a central dome portion and a shoulder portion that surrounds the central dome portion and extends from an outer circumference of the weld face upwardly and radially inwardly to the central dome portion. Regarding the central dome portion, it has a base dome face surface and a series of radially-spaced ringed ridges. Each of the series of radially-spaced ringed ridges on the central dome portion projects outwardly from the base dome face surface and surrounds a central axis of the weld face. The series of radially-spaced ringed ridges on the central dome portion includes an innermost ringed ridge that is closest to the central axis of the weld face and an outermost ringed ridge that is farthest from the central axis of the weld face such that the series of radially-spaced ringed ridges on the central dome portion increases in plan diameter from the innermost ringed ridge to the outermost ringed ridge. Moreover, the outermost ringed ridge on the central dome portion has a radial inner side surface and a radial outer side surface. The radial outer side surface of the outermost ringed ridge on the central dome portion extends below the base dome face surface down to the shoulder portion and has a height that is greater than a height of the radial inner side surface. Regarding the shoulder portion, it has a base shoulder surface and includes one or more ringed surface features. Each of the one or more ringed surface features intrudes inwardly into or projects outwardly from the base shoulder surface, respectively, and surrounds the central dome portion.

The welding electrode of the aforementioned embodiment may include additional structure or be further defined. For example, the one or more ringed surface features may include a a groove that intrudes inwardly into the base shoulder surface and is adjacent to the central dome portion and partially defined by the radial outer side surface of the outermost ringed ridge of the central dome portion. As another example, the base shoulder surface may be depressed below the base dome face surface of the central dome portion and may include a radial inboard portion that is located adjacent to and contiguous with the radial outer side surface of the outermost ringed ridge of the central dome portion, and the one or more ringed surface features may include a ringed ridge that projects outwardly from the base shoulder surface of the shoulder portion.

A method of resistance spot welding according to one embodiment of the present disclosure may include several steps. In one step, a workpiece stack-up is provided that includes an aluminum workpiece and a steel workpiece that overlaps with the aluminum workpiece to establish a faying interface between the aluminum and steel workpieces. The workpiece stack-up has an aluminum workpiece surface that provides a first side of the stack-up and a steel workpiece surface that provides an opposed second side of the stack-up.

In another step, the workpiece stack-up is positioned between a weld face of a first welding electrode and a weld face of as second welding electrode. The first welding electrode includes a body and a weld face. The body has a front end and an opposite back end. The weld face is supported on the front end of the body and comprises a central dome portion and a shoulder portion that surrounds the central dome portion and extends from an outer circumference of the weld face upwardly and radially inwardly to the central dome portion. The central dome portion has a base dome face surface and a series of radially-spaced ringed ridges. Each of the series of radially-spaced ringed ridges on the central dome portion projects outwardly from the base dome face surface and surrounds a central axis of the weld face. The series of radially-spaced ringed ridges on the central dome portion includes an innermost ringed ridge that is closest to the central axis of the weld face and an outermost ringed ridge that is farthest from the central axis of the weld face such that the series of radially-spaced ringed ridges on the central dome portion increases in plan diameter from the innermost ringed ridge to the outermost ringed ridge. Moreover, the outermost ringed ridge on the central dome portion has a radial inner side surface and a radial outer side surface. The radial outer side surface of the outermost ringed ridge on the central dome portion extends below the base dome face surface down to the shoulder portion of the weld face.

In another step of the method of the aforementioned embodiment, the weld face of the first welding electrode is pressed against the first side of the workpiece stack-up and the weld face of the second welding electrode is pressed against the second side of the workpiece stack-up in facial alignment with the weld face of the first welding electrode at a weld location. In another step, an electrical current is passed momentarily between the weld face of the first welding electrode and the weld face of the second welding electrode, and through the workpiece stack-up, to grow a molten aluminum weld pool within the aluminum workpiece that wets an adjacent faying surface of the steel workpiece. The molten aluminum weld pool eventually solidifies into a weld joint upon cessation of passage of the electrical current.

DETAILED DESCRIPTION

Figure 1:
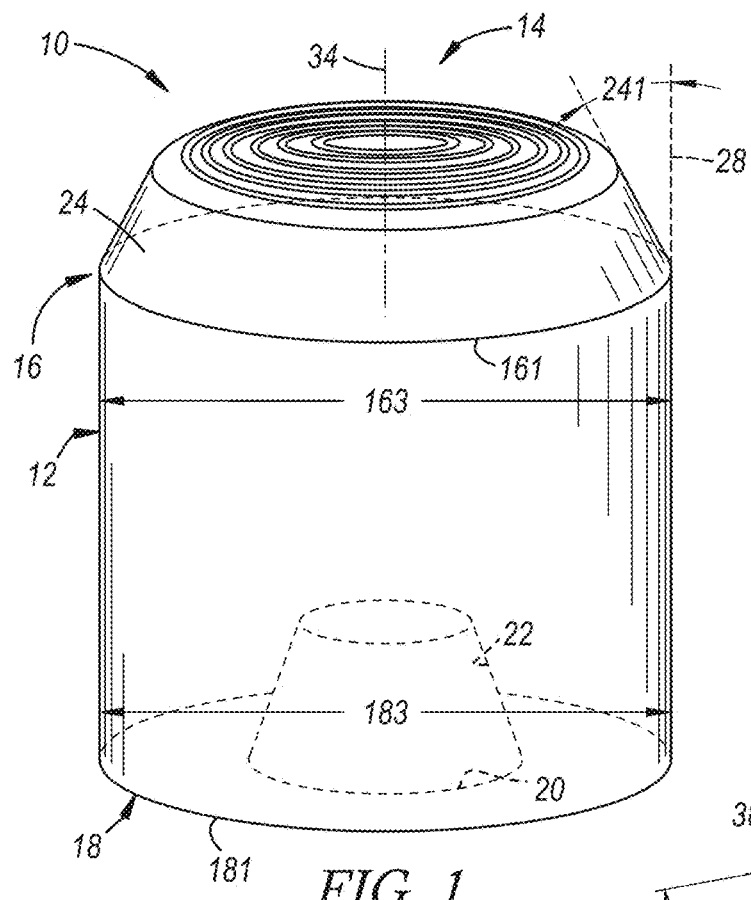
FIG. 1 is a perspective view of a welding electrode according to one embodiment of the disclosure that may be used in resistance spot welding operations.

A wide variety of resistance spot welding electrode constructions are currently available. A large portion of those electrodes have been designed to accommodate welding of similar metal workpieces including, for instance, stack-ups of two or more steel workpieces or stack-ups of two or more aluminum workpieces. These known welding electrodes do not necessarily possess the capability to effectively weld stack-ups of dissimilar metal workpieces, such as stack-ups that include an aluminum workpiece and an adjacent steel workpiece, while passing an electrical current in accordance with a weld schedule developed specifically for the precise combination of dissimilar metal workpieces included in the stack-up. A welding electrode construction and, in particular, an electrode weld face design, that can successfully participate in resistance spot welding of a variety of workpiece stack-ups, whether containing similar or dissimilar metal workpieces, has been developed and is described generally and in connection with several preferred embodiments below. The welding electrode may, for example, be pressed into contact with an aluminum workpiece or a steel workpiece during welding of a stack-up of two or more overlapping steel workpieces, during welding of a stack-up or two or more overlapping aluminum workpieces, or during welding of a stack-up that includes an aluminum workpiece and an adjacent overlapping steel workpiece.

Several embodiments of the disclosed welding electrode are shown in FIGS. 1-10. In each of the embodiments shown, the welding electrode includes a weld face that comprises a central dome portion and a shoulder portion that surrounds the central dome portion. The central dome portion includes a series of radially-spaced ringed ridges. One of those ringed ridges—referred to as the outermost ringed ridge on the central dome portion—includes a radial inner surface and a radial outer surface. The radial outer surface of the outermost ringed ridge on the central dome portion extends down to the shoulder portion of the weld face and defines the boundary between the central portion and the shoulder portion of the weld face. The height of the radial outer surface of the outermost ringed ridge on the central dome portion is greater than a height of the radial inner surface. In this way, and as will be further explained below, the weld face facilitates a unique thermal treatment in an aluminum workpiece when engaged with an aluminum workpiece during the welding of a workpiece stack-up that includes adjacent aluminum and steel workpieces. The thermal treatment limits the hardening of the heat affected zone (HAZ)—particularly in subsequent baking operations—that surrounds the established weld joint and creates a "hinge effect" that deflects initiated cracks up into the softer weld nugget portion of the weld joint and away from the brittle intermetallic layer when the welded stack-up is subject to loading.

The use of the disclosed welding electrode is not limited solely for engagement with an aluminum workpiece of a workpiece stack-up that includes adjacent aluminum and steel workpieces. To be sure, if desired, the same welding electrode construction may also be used to engage the steel workpiece of a workpiece stack-up that includes adjacent aluminum and steel workpieces, thus resulting in the same weld face design being pressed against opposite sides of the stack-up in facial alignment with each other. In this scenario, the weld face in pressed contact with the aluminum workpiece facilitates the thermal treatment in the aluminum workpiece as mentioned above, while also stressing and mechanically breaking down a surface oxide layer, if present, on the aluminum workpiece. At the same time, the weld face in pressed contact with the steel workpiece causes the electrical current that is passed between the weld faces and through the workpiece stack-up to assume a conical flow path in which the current density decreases from the weld face in contact with the steel workpiece to the weld face in contact with the aluminum workpiece. The greater concentration of the electrical current in the steel workpiece, in turn, helps drive and consolidate weld defects towards the center of the weld joint where they are less liable to adversely affect the strength of the joint. Additionally, the disclosed welding electrode may be employed with stack-ups that include two or more steel workpieces or two or more aluminum workpieces as the weld face design can tolerate the welding of both types of stack-ups.

Referring now to FIGS. 1-4, a first embodiment of the disclosed welding electrode is shown. The welding electrode shown here is identified by reference numeral 10. The welding electrode 10 includes an electrode body 12 and a weld face 14. The electrode body 12, which is preferably cylindrical in shape, has a front end 16 that presents and supports the weld face 14 and a back end 18 that facilitates mounting of the electrode 10 to a weld gun. The front end 16 of the electrode body 12 has circumference 161 and the back end 18 has a circumference 181. A diameter 163 of the electrode body 12 taken at the circumference 161 of the front end 16 preferably lies within the range of 12 mm to 22 mm or, more narrowly, within the range of 16 mm to 20 mm, and a diameter 183 of the electrode body 12 taken at the circumference 181 of the back end 18 may be the same as the diameter 161 at the front end 16, particularly if the electrode body 12 is cylindrically shaped. Moreover, as shown generally in FIG. 1, the back end 18 of the electrode body 12 defines an opening 20 to an internal recess 22 for insertion of, and attachment with, an electrode mounting device, such as a shank adapter (not shown), that can secure the spot welding electrode 10 to a gun arm of the weld gun and also enable a flow of cooling fluid (e.g., water) through the internal recess 22 in order to manage the temperature of the electrode 10 during spot welding operations.

The weld face 14 is the portion of the welding electrode 10 that, during spot welding, contacts a side of a workpiece stack-up under pressure and communicates electrical current through the stack-up in conjunction with the weld face of an opposed and facially aligned welding electrode that contacts the opposite side of the stack-up under pressure. The weld face 14 may be upwardly displaced from the front end 16 of the electrode body 12 by a transition nose 24 or it may transition directly from the front end 16 to provide what is commonly referred to as a "full face electrode". When the transition nose 24 is present, the weld face 14 may be upwardly displaced from the front end 16 by a distance 26 that preferably lies between 2 mm to 10 mm. The transition nose 24 may be frustoconical or truncated spherical in shape, although other shapes are certainly possible. If frustoconical, the angle of truncation 241 of the nose 24 is preferably between 30° and 60° from a vertical extension 28 of the circumference 161 of the front end 16 of the electrode body 12. If truncated spherical, the radius of curvature of the transition nose 24 is preferably between 6 mm and 12 mm.

Figure 2:
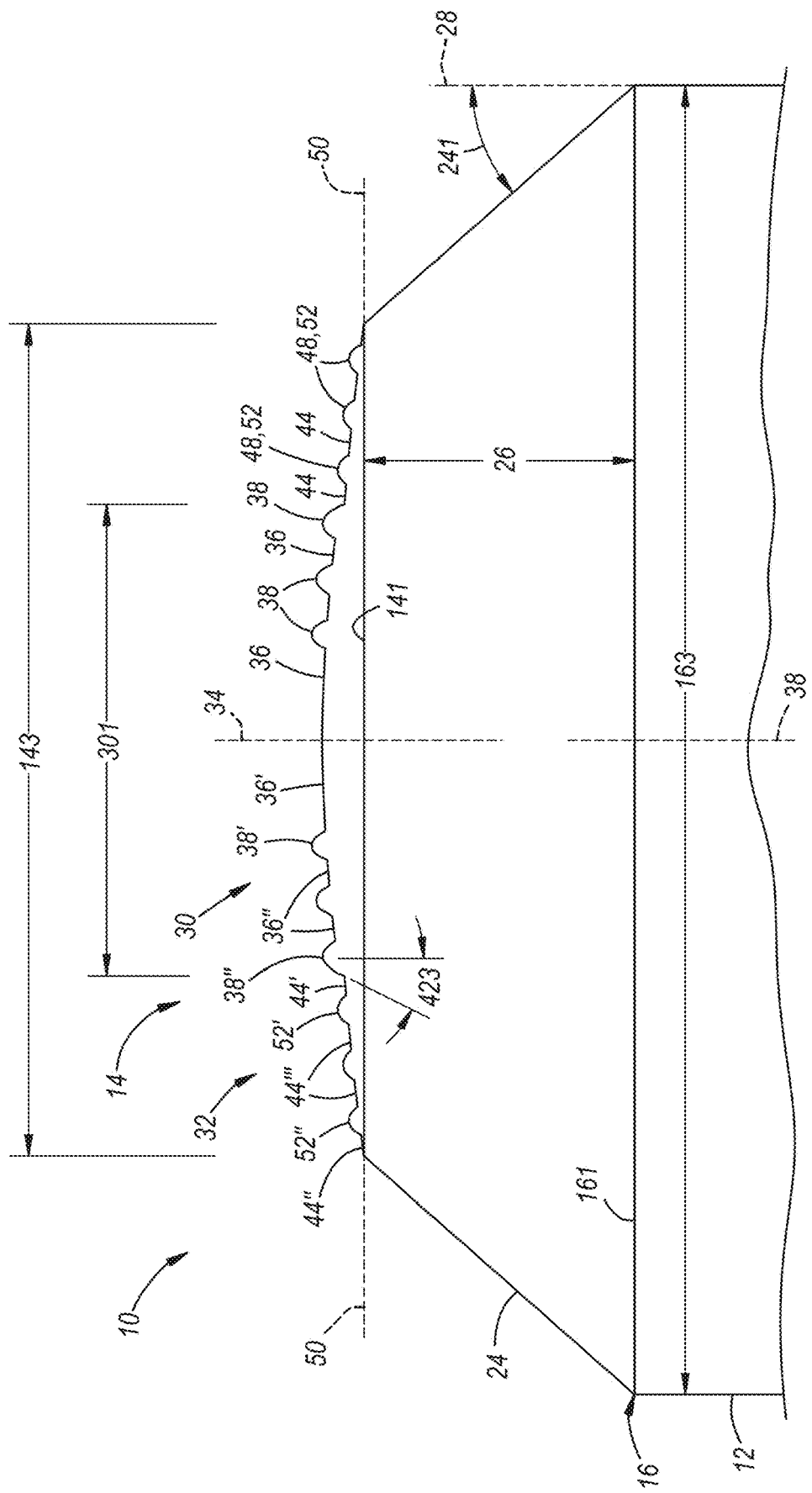
FIG. 2 is a partial cross-sectional view of the welding electrode depicted in FIG. 1 according to one embodiment of the disclosure.

Referring now to FIG. 2, the weld face 14 includes a central dome portion 30 and a shoulder portion 32. The central dome portion 30 is centered about a central axis 34 of the weld face 14, and the shoulder portion 32 surrounds the central dome portion 30 and extends from an outer circumference 141 of the weld face 14 upwardly and inwardly to the central dome portion 30. The weld face outer circumference 141 has a diameter 143 that preferably ranges from 6 mm to 20 mm, or more narrowly from 8 mm to 15 mm, and it may be oriented relative to the circumference 161 of the front end 16 of the electrode body 12 in different ways. For example, as shown here in FIGS. 1-2, the outer circumference 141 of the weld face 14 may be parallel to the circumference 161 of the front end 16 of the electrode body 12, in which case the central weld face axis 34 may be parallel to and collinearly aligned with a central axis 38 of the electrode body 12. In other embodiments, however, the outer circumference 141 of the weld face 14 may be tilted relative to the circumference 161 of the electrode body 12 at its front end 16, in which case the central weld face axis 34 and the central axis 38 of the electrode body 12 are angled with respect to one another. The latter configuration of the welding electrode 10 may be employed to help gain access to a weld location of the workpiece stack-up that would otherwise be difficult to reach. In still other embodiments, the electrode body 12 may be of the single-bend or a double-bend variety.

The central dome portion 30 has a base dome face surface 36 and a series of radially-spaced ringed ridges 38. The base dome face surface 36 has a convex profile. For instance, in one particular implementation, the base dome face surface 36 may be spherically shaped (i.e., it is a portion of a sphere) and may have a radius of curvature that ranges from of 10 mm to 100 mm or, more narrowly, from 20 mm to 50 mm. Each of the series of radially-spaced ringed ridges 38 projects outwardly from the base dome face surface 36 and has a closed circumference that surrounds the central axis 34 of the weld face 14. In that regard, the series of radially-spaced ringed ridges 38 is preferably centered about and concentrically surrounds the central axis 34 of the weld face 14. The term "closed circumference" as used in connection with the radially-spaced ringed ridges 38 means that the ridge 38 is continuously curved when viewed from above in plan perspective such that its circumference is not interrupted by the base dome face surface 36.

The size, shape, and spacing of the radially-spaced ringed ridges 38 may vary. Each of the ringed ridges 38 on the central dome portion 30 has a ridge height 381 and a ridge width 383, as shown best in FIG. 3. The ridge height 381 of each ridge 38 is the maximum distance to which the ridge 38 rises above the base dome face surface 36, and the ridge width 383 of each ridge 38 is the radial thickness of the ridge 38 along the base dome face surface 36. The ridge height 381 of each of the ringed ridges 38 preferably ranges from 20 μm to 500 μm or, more narrowly, from 50 μm to 300 μm. The ridge width 383 of each of the ringed ridges 38 preferably ranges from 100 μm to 2000 μm or, more narrowly, from 200 μm to 1000 μm. As for the spacing of the radially-spaced ringed ridges 38 on the central dome portion 30, each of the ringed ridges 38 is preferably radially spaced apart from each of its neighboring ridges 38 by a distance that ranges from 100 μm to 2500 μm or, more narrowly, from 400 μm to 1600 μm, as measured between midpoints of the ridges 38. The cross-sectional profile of each of the series of radially-spaced ringed ridges 38 may lack sharp corners and have a rounded (as shown) or flat top surface. In certain embodiments, each of the radially-spaced ringed ridges may be semicircular, truncated semicircular, triangular, or truncated triangular in cross-section.

The series of radially-spaced ringed ridges 38 on the central dome portion 30 includes an innermost ringed ridge 38' that is closest to the central axis 34 of the weld face 14 and an outermost ringed ridge 38" that is farthest from the central axis 34 of the weld face 14 such that the series of radially-spaced ringed ridges 38 increases in plan diameter from the innermost ringed ridge 38' to the outermost ringed ridge 38". The innermost ringed ridge 38' encloses an interior middle portion 36' of the base dome face surface 36 and each pair of ringed ridges 38 from the innermost ringed ridge 38' to the outermost ringed ridge 38" is separated by an intervening portion 36" of the base dome face surface 36. The base dome face surface 36 does not extend radially beyond the outermost ringed ridge 38". The interior middle portion 36' of the base dome face surface 36 may have a convex dome curvature, as shown, or alternatively it may be flat or it may surround either a central projection such as a plateau or a spherical ball that projects outwardly from the interior middle portion 36' of the base dome face surface 36 or a central intrusion such as a cylindrical, conical, or spherical depression that intrudes into the interior middle portion 36' of the base dome face surface 36. A plan diameter of the innermost ringed ridge 38' as measured at the midpoint of the innermost ringed ridge 38' preferably ranges from 3 mm to 12 mm or, more narrowly, from 5 mm to 10 mm. In many instances, anywhere from two to five ringed ridges 38 are preferably present on the central dome portion 30, with three to five ringed ridges 38 being particularly functional.

Figure 4:
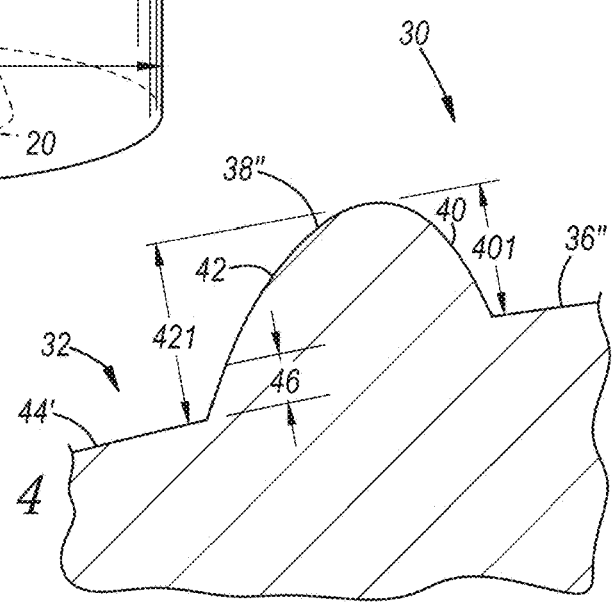
FIG. 4 is another magnified partial cross-sectional view of the weld face of the welding electrode depicted in FIG. 2 according to one embodiment of the disclosure.

Additionally, and as shown best in FIG. 4, the outermost ringed ridge 38" has a radial inner side surface 40 and a radial outer side surface 42. The radial inner side surface 40 of the outermost ringed ridge 38' rises upwardly from the base dome face surface 36 and, in particular, the intervening portion 36" of the base dome face surface 36 that separates the outermost ringed ridge 38" from the radially inwardly adjacent ringed ridge 38. The radial outer side surface 42 of the outermost ringed ridge 38", on the other hand, extends below the base dome face surface 36—and, in particular, below the adjacent intervening portion 36" of the base dome face surface 36 that separates the outermost ringed ridge 38" and its radially inwardly neighboring ringed ridge 38—to the shoulder portion 32 of the weld face 14. A height 421 of the radial outer side surface 42 (measured normal to the adjacent base shoulder surface) may thus be greater than a height 401 of the radial inner side surface 40 (measured normal to the adjacent base dome face surface). For example, the height 421 of the radial outer side surface 42 may range from 120 μm to 600 μm or, more narrowly, from 150 μm to 400 μm, while the height 401 of the radial inner side surface 40 may range from 20 μm to 400 μm or, more narrowly, from 50 μm to 250 μm. The height 401 of the radial inner side surface 40 may or may not be equal to the ridge height 381 of the outermost ringed ridge 38" depending on the cross-sectional shape of the outermost ringed ridge 38". Additionally, the radial outer side surface 42 may be outwardly flared and form an angle 423 (FIG. 2) with the central axis 34 of the weld face 14 that ranges from 10° to 60°.

The radial outer side surface 42 of the outermost ringed ridge 38" establishes the periphery of the central dome portion 30. The central dome portion 30 has a plan diameter 301 measured at its periphery that may range from 3 mm to 12 mm or, more narrowly, from 5 mm to 10 mm. As will be further explained in more detail below, the structure of the central dome portion 30—and especially the fact that the radial outer side surface 42 of the outermost ringed ridge 38"

extends down below the base dome face surface 36 to the shoulder portion 32—provides the welding electrode 10 with the capacity to successfully participate in resistance spot welding of workpiece stack-ups that include various combinations of metal workpieces. The weld face 14 may be pressed under pressure against an aluminum workpiece regardless of whether that aluminum workpiece overlaps one or more other aluminum workpieces or whether it overlaps and lies adjacent to a steel workpiece. The weld face 14 may also be pressed under pressure against a steel workpiece that overlaps and lies adjacent to an aluminum workpiece along with a weld face having the same or different construction being pressed against the aluminum workpiece on the opposite side of the stack-up.

Still referring to FIGS. 1-4, the shoulder portion 32 of the weld face 14 includes a base shoulder surface 44 that is curved or angled upwardly from the outer circumference 141 of the weld face 14 towards the central dome portion 30 and is depressed below the base dome face surface 36 of the central dome portion 30. The base shoulder surface 44 is depressed below the base dome face surface 36 by being displaced downwardly out of alignment with the base dome face surface 36 over a distance of at least one millimeter radially outside of the central dome portion 30. The base shoulder surface 44 may be depressed below the base dome face surface 36 of the central dome portion by a distance 46 (FIG. 4) that ranges from 0.05 mm to 1.0 mm or, more narrowly, from 0.1 mm to 0.5 mm. The shoulder portion 32 further includes one or more ringed surface features 48. Each of the one or more ringed surface features 48 intrudes inwardly into or projects outwardly from the base shoulder surface 44, respectively, and has a closed circumference that surrounds the central dome portion 30. The term "closed circumference" as used in connection with the ringed surface feature(s) 48 means that the surface feature 48 is continuously curved when viewed from above in plan perspective such that its circumference is not interrupted by the base shoulder surface 44. The one or more ringed surface features 48 preferably concentrically surround the central dome portion 30.

In the welding electrode 10 embodiment shown here, and as depicted best in FIG. 2, the base shoulder surface 44 may be planar and angled upwardly. For instance, in one particular implementation, the base shoulder surface 44 may be upwardly inclined relative to a horizontal plane 50 that extends through the outer circumference 141 of the weld face 14 at an angle that ranges from 3° to 20° or, more narrowly, from 5° to 10°. In another implementation, the base shoulder surface 44 may be spherically rounded with a radius of curvature that ranges from 10 mm to 100 mm or, more narrowly, from 20 mm to 50 mm. The one or more ringed surface features 48 may be one or more ringed ridges 52. Each the one or more ringed ridges 52 on the shoulder portion 32 projects outwardly from the base shoulder surface 44 and has a closed circumference that surrounds the central dome portion 30 of the weld face 14. Additionally, the cross-sectional profile of each of the one or more ringed ridges 52 may lack sharp corners and have a rounded (as shown) or flat top surface. In many instances, anywhere from one to six ringed ridges 52 are preferably present on the shoulder portion 32, with two to five ringed ridges 52 being particularly functional. In another embodiment, and as will be further explained below, the one or more ringed surface features 48 may be one or more ringed grooves.

The size, shape, and spacing of the ringed ridge(s) 52 may vary similar to that of the radially-spaced ringed ridges 38 on the central dome portion 30. Indeed, as shown best in FIG. 3, each of the ringed ridges 52 on the shoulder portion 32 has a ridge height 521 and a ridge width 523. The ridge height 521 of each ridge 52 is the maximum distance to which the ridge 52 rises above the base shoulder surface 44, and the ridge width 523 of each ridge 52 is the radial thickness of the ridge 52 along the base shoulder surface 44. The ridge height 521 of each of the ringed ridges 52 preferably ranges from 20 µm to 500 µm or, more narrowly, from 50 µm to 300 µm. The ridge width 523 of each of the ringed ridges 52 preferably ranges from 100 µm to 2000 µm or, more narrowly, from 200 µm to 1000 µm. As for the spacing of the one or more ringed ridges 52 on the shoulder portion 32, each of the ringed ridges 52 is preferably radially spaced apart from each of its neighboring ridges 52 (if more than one ridge 52 is present) by a distance that ranges from 100 µm to 2500 µm or, more narrowly, from 400 µm to 1600 µm, as measured between midpoints of the ridges 52.

Figure 3:
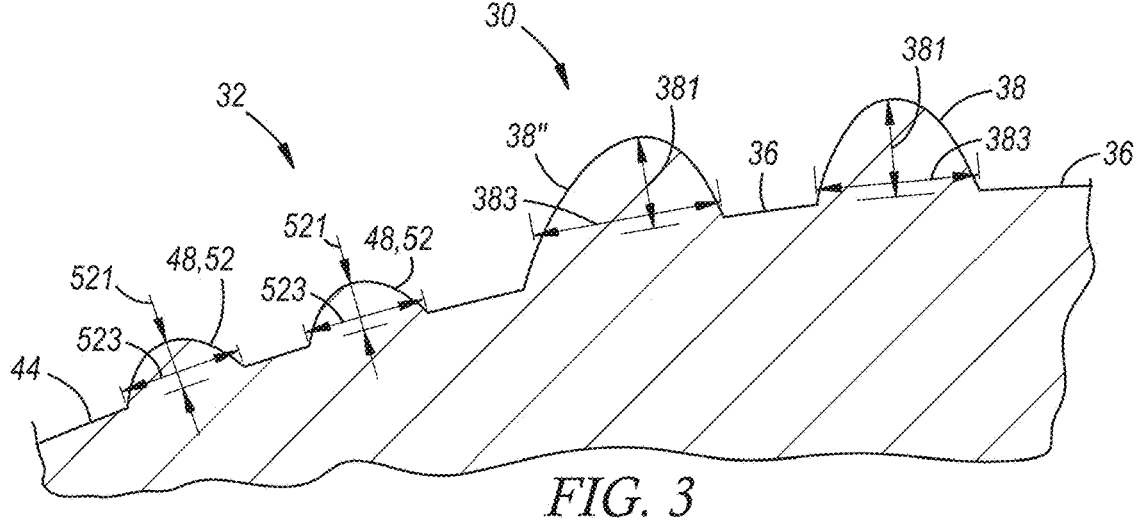
FIG. 3 is a magnified partial cross-sectional view of the weld face of the welding electrode depicted in FIG. 2 according to one embodiment of the disclosure.

In one particular embodiment, as shown in FIGS. 2-3, a series of radially-spaced ringed ridges 52 is preferably centered about and concentrically surrounds the central dome portion 30 of the weld face 14. The series of radially-spaced ringed ridges 52 on the shoulder portion 32, which may have between two and six ridges 52, includes an innermost ringed ridge 52' that is closest to the central dome portion 30 and an outermost ringed ridge 52" that is farthest from the central dome portion 30 such that the series of radially-spaced ringed ridges 52 increases in plan diameter from the innermost ringed ridge 52' to the outermost ringed ridge 52". The series of radially-spaced ringed ridges 52 may be positioned, as shown here, between a radial inboard portion 44' and a radial outboard portion 44" of the base shoulder surface 44. The radial inboard portion 44' is located radially inwardly of the innermost ringed ridge 52' and is adjacent to and contiguous with the radial outer side surface 42 of the outermost ringed ridge 38" of the central dome portion 30 (FIG. 4), and the radial outboard portion 44" is located radially outwardly of the outermost ringed ridge 52" and extends radially inwardly from the outer circumference 141 of the weld face 14 to the outermost ringed ridge 52". Each pair of ringed ridges 52 from the innermost ringed ridge 52' to the outermost ringed ridge 52" is separated by an intervening portion 44''' of the base shoulder surface 44.

At least the weld face 14 of the welding electrode 10, and preferably the entire welding electrode 10 including the electrode body 12, the weld face 14, and the transition nose 24, if present, is constructed from a material having an electrical conductivity of at least 45% IACS and a thermal conductivity of at least 180 W/mK. Some material classes that fit these criteria include a copper alloy, a dispersion-strengthened copper material, and a refractory-based material that includes at least 35 wt %, and preferably at least 50 wt %, of a refractory metal. Specific examples of suitable copper alloys include a C15000 copper-zirconium (CuZr) alloy, a C18200 copper-chromium (CuCr) alloy, and a C18150 copper-chromium-zirconium (CuCrZr) alloy. A specific example of a dispersion-strengthened copper material includes copper with a dispersal of aluminum oxide. And a specific example of a refractory-based material includes a tungsten-copper metal composite that contains between 50 wt % and 90 wt % of a tungsten particulate phase dispersed in copper matrix that constitutes the balance (between 50 wt % and 10 wt %) of the composite. Other materials not expressly listed here that meet the applicable electrical and thermal conductivity standards may of course be used as well.

In the embodiment depicted in FIGS. 1-4, the radial outer side surface 42 of the outermost ringed ridge 38' on the central dome portion 30 extends downwardly below the base dome face surface 36 to the radial inboard portion 44' of the base shoulder surface 44, which is depressed below the base dome face surface 36. Variations to the welding electrode 10 shown in FIGS. 1-4 are certainly possible. For example, in one alternative embodiment, only the innermost ringed ridge 52' shown in FIGS. 1-4 may be present on the shoulder portion 32. Other embodiments are also contemplated including the second, third, and fourth embodiments of the disclosed welding electrode depicted in FIG. 5, FIG. 6, and FIG. 7-9, respectively. The welding electrodes illustrated in FIG. 5, FIG. 6, and FIGS. 7-9 are identified by reference numerals 110, 210, and 310, respectively. These welding electrodes 110, 210, 310 are similar in many respects to the welding electrode 10 shown in FIGS. 1-4. In FIGS. 5-9, reference numerals that correspond to the previously-described welding electrode 10 are used to designate corresponding structural features. The use of corresponding reference numerals is intended to incorporate the earlier discussion of those structural features as if fully recited herein as modified by any additional description that may be provided. As such, when discussing FIGS. 5-9, only the material structural differences of the welding electrodes 110, 210, 310 will be discussed as compared to the welding electrode 10 shown in FIGS. 1-4 and described above.

Figure 5:
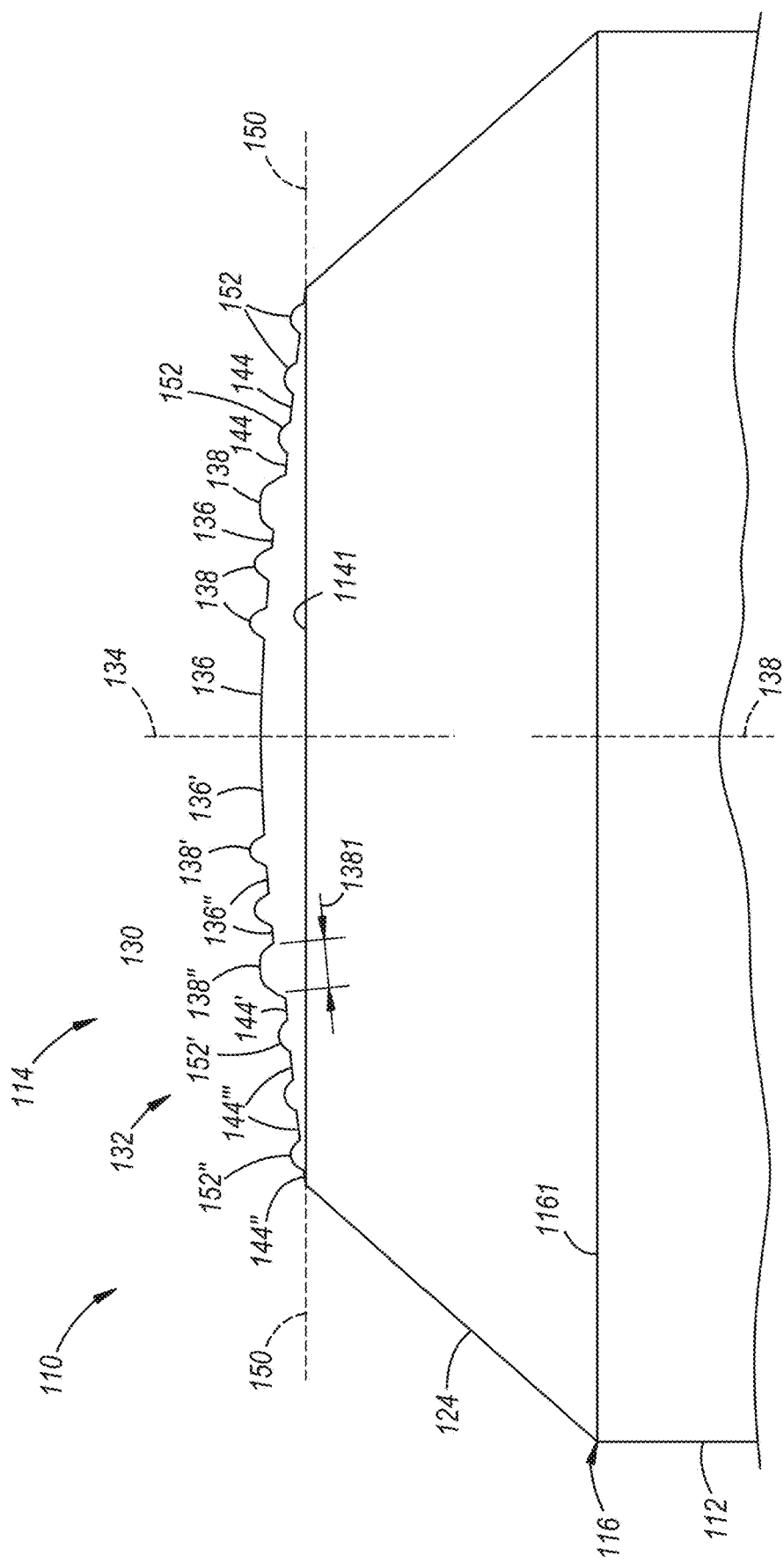
FIG. 5 is a partial cross-sectional view of a welding electrode according to another embodiment of the disclosure.

The welding electrode 110 in FIG. 5 includes an outermost ringed ridge 138" on the central dome portion 130 that is shaped differently from the other ringed ridges 138 on the central dome portion 130. Specifically, the outermost ringed ridge 138" is wider at the base dome face surface 136. The outermost ringed ridge 138" has a width 1381" that preferably ranges from 250 μm to 2250 μm or, more narrowly, from 500 μm to 1500 μm. By having larger width dimension on the outermost ringed ridge 138" of the central dome portion 130, the weld face 114 produces a wider depression in the aluminum workpiece that can extend the hinge effect over a broader radial location. As for the welding electrode 210 depicted in FIG. 6, it has a shoulder portion 232 that includes a base shoulder surface 244 that is free of protruding ringed ridges and intruding ringed grooves and extends from the outer circumference 2141 of the weld face 214 to the radial outer side surface 242 of the outermost ringed ridge 238" on the central dome portion 230. In other words, the base shoulder surface 244 is depressed below the base dome face surface 236 of the central dome portion 230 but it does not include any of the ringed surface features 48 described above in connection with FIGS. 1-4. The base shoulder surface 244 may be curved or angled upwardly from the outer circumference 2141 of the weld face 214 to the radial outer side surface 242 of the outermost ringed ridge 238" on the central dome portion 230. The lack of the ringed surface features 48 on the shoulder portion 232 provides a reduced ability to transfer heat to the welding electrode 110, thus causing the aluminum in that location to run hotter and produce a softer HAZ, which improves the hinge effect.

In welding electrode shown in FIGS. 7-9, the shoulder portion 332 of the weld face 314 includes a base shoulder surface 344 that is depressed below the base dome face surface 336 of the central dome portion 330, as before, and further includes one or more ringed grooves 354 as the one or more ringed surface features 48. The base shoulder surface 344 may be curved or angled upwardly from the outer circumference 3141 of the weld face 314 towards the central dome portion 330. Each of the one or more ringed grooves 354 on the shoulder portion 332 intrudes inwardly into the base shoulder surface 344 and has a closed circumference that surrounds the central dome portion 330 of the weld face 314. The one or more ringed grooves 354 may be a series of radially-spaced ringed grooves 354 similar in arrangement to the series of radially-spaced ringed ridges depicted in FIGS. 1-4. Additionally, the cross-sectional profile of each of the one or more ringed grooves 354 may lack sharp corners and have a rounded (as shown) or flat bottom surface.

The size, shape, and spacing of the one or more ringed grooves 354 may vary similar to that of the one or more ringed ridges 52 on the shoulder portion 32 of the welding electrode 10 shown in FIGS. 1-4. Indeed, each of the ringed grooves 354 on the shoulder portion 332 has a groove depth 3541 and a groove width 3543, as shown best in FIG. 8. The groove depth 3541 of each groove 354 is the maximum distance to which the groove 354 descends below the base shoulder surface 344, and the groove width 3543 of each groove 354 is the radial thickness of the groove 354 along the base shoulder surface 344 (i.e., across the entrance of the groove 354). The groove depth 3541 of each of the ringed grooves 354 preferably ranges from 20 μm to 500 μm or, more narrowly, from 50 μm to 300 μm. The groove width 3543 of each of the ringed grooves 354 preferably ranges from 100 μm to 2000 μm or, more narrowly, from 200 μm to 1000 μm. As for the spacing of ringed grooves 354 on the shoulder portion 332, each of the ringed grooves 354 is preferably radially spaced apart from each of its neighboring grooves 354 (if more than one groove 354 is present) by a distance that ranges from 100 μm to 2500 μm or, more narrowly, from 400 μm to 1600 μm, as measured between midpoints of the grooves 354.

Figure 7:
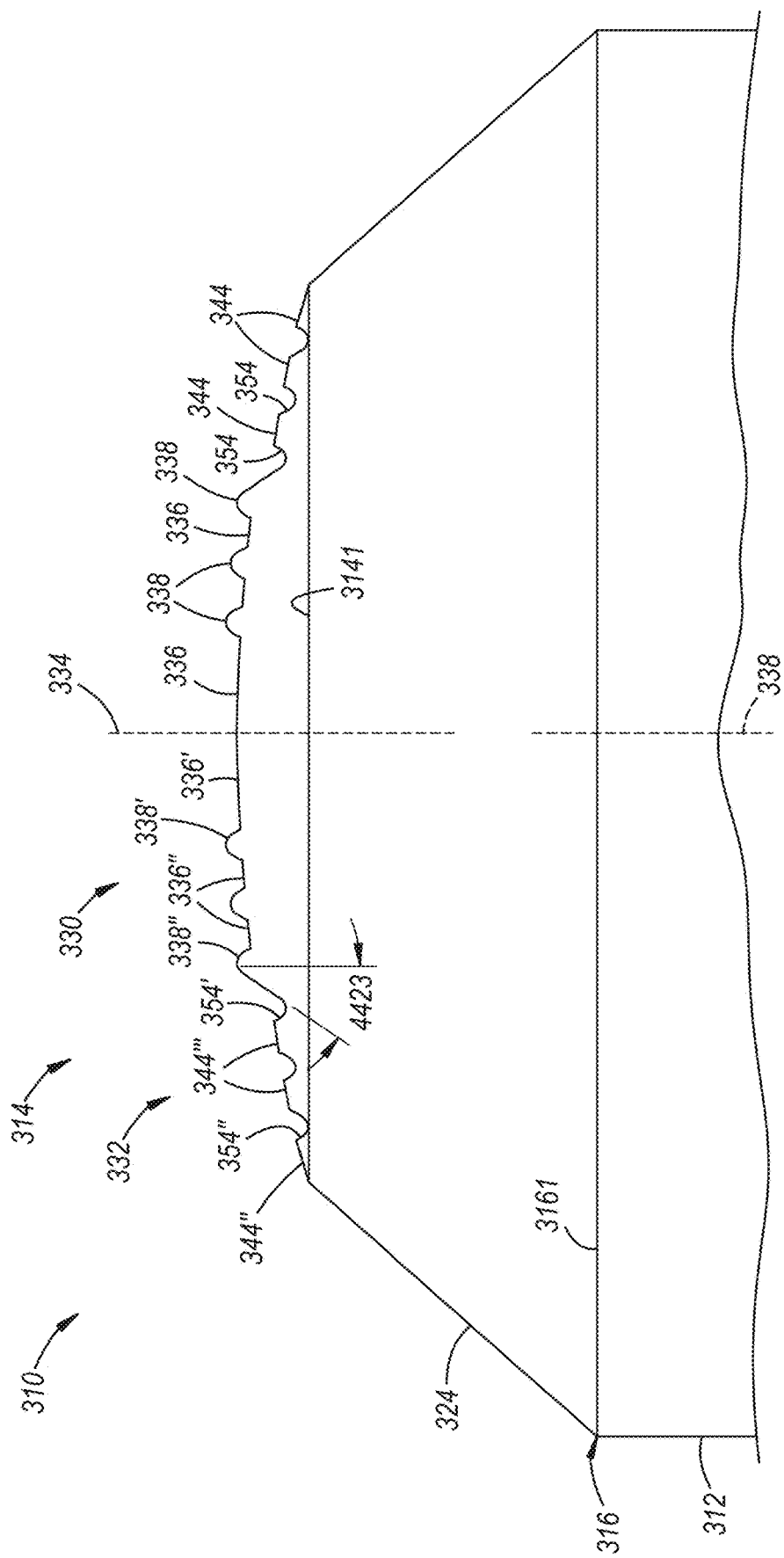
FIG. 7 is a partial cross-sectional view of a welding electrode according to still another embodiment of the disclosure.
Figure 8:
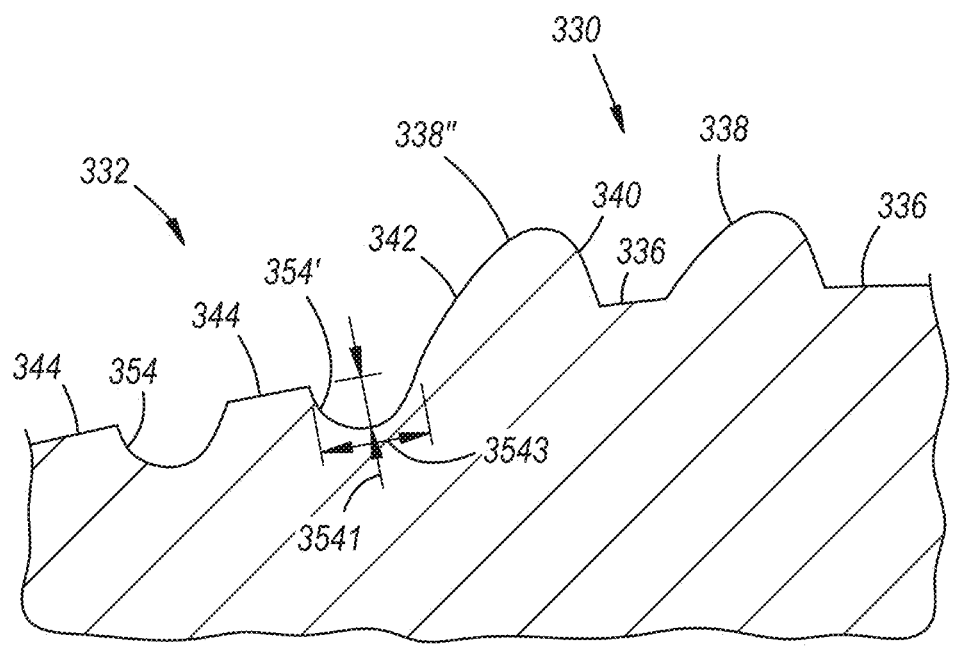
FIG. 8 is a magnified partial cross-sectional view of the weld face of the welding electrode depicted in FIG. 7 according to one embodiment of the disclosure.
Figure 9:
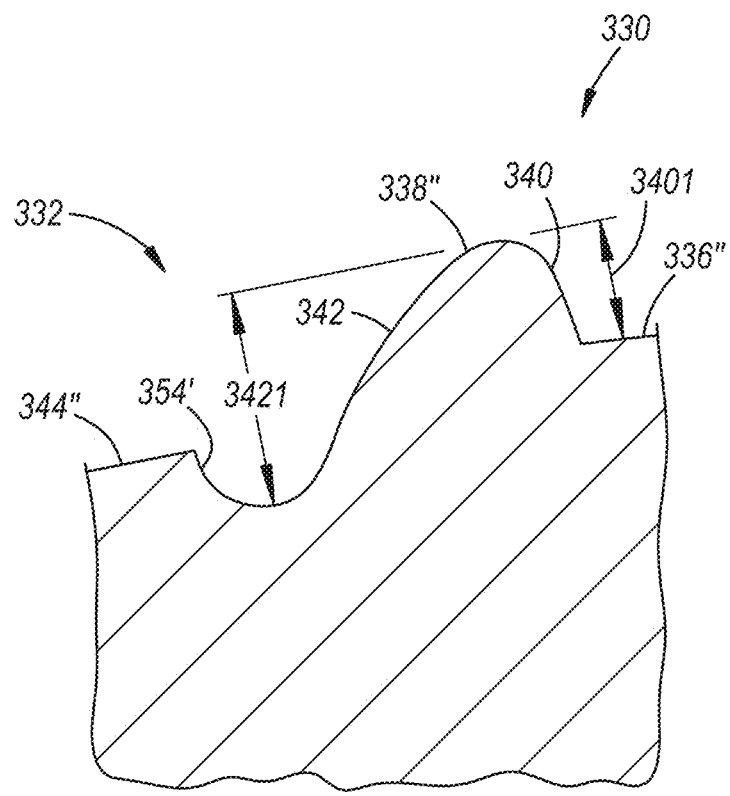
FIG. 9 is another magnified partial cross-sectional view of the weld face of the welding electrode depicted in FIG. 7 according to one embodiment of the disclosure.

In one particular embodiment, as shown here in FIGS. 7-9, a series of radially-spaced ringed grooves 354 is preferably centered about and concentrically surrounds the central dome portion 30 of the weld face 14. The series of radially-spaced ringed grooves 354 on the shoulder portion 332 includes an innermost ringed groove 354' that is closest to the central dome portion 330 and an outermost ringed groove 354" that is farthest from the central dome portion 330 such that the series of radially-spaced ringed grooves 354 increases in plan diameter from the innermost ringed groove 354' to the outermost ringed groove 354". More specifically, the innermost ringed groove 354' is adjacent to the central dome portion 330 and is partially defined by the radial outer side surface 342 of the outermost ringed ridge 338" of the central dome portion 330, as shown in FIGS. 8-9. The outermost ringed ridge 354" is adjacent to a radial outboard portion 344" of the base shoulder surface 344 that extends radially inwardly from the outer circumference 3141 of the weld face 314 to the outermost ringed groove 354" of the shoulder portion 332. Each pair of ringed grooves 354 from the innermost ringed groove 354' to the outermost ringed groove 354" is separated by an intervening portion 344''' of the base shoulder surface 344. In many instances, as before, anywhere from two to six ringed grooves 354 are preferably present on the shoulder portion 332, with two to five ringed grooves 354 being particularly functional. In a variation of this embodiment, only the innermost ringed groove 354' adjacent to the central dome portion 330 may be present on the shoulder portion 332.

In the welding electrode 310 illustrated in FIGS. 7-9, and as shown best in FIGS. 8-9, the radial outer side surface 342 of the outermost ringed ridge 338" on the central dome portion 330 extends downwardly below the base dome face surface 336 and partially defines the innermost ringed groove 354' located adjacent to and surrounding the central dome portion 330. In this way, the height 3421 of the the radial outer side surface 342 of the outermost ringed ridge 338" of the central dome portion 330 can be increased even more over the height 3401 of the radial inner side surface 340 of the outermost ringed ridge 338" without having to increase the ridge height 381 of the outermost ringed ridge 338" of the central dome portion 330. This is because, as shown, the radial outer side surface 342 of the outermost ringed ridge 338" of the central dome portion 330 extends below the base dome face surface 336 of the central dome portion 30 and also below the base shoulder surface 344 of the shoulder portion 332, which, in this embodiment, is also depressed below the base dome face surface 336 of the central dome portion 30. Additionally, the radial outer side surface 342 of the outermost ringed ridge 338" of the central dome portion 330 may be outwardly flared to a greater extent compared to the previous welding electrodes 10, 110, 210 when it partially defines a ringed groove 354 in the shoulder portion 332. For example, the radial outer side surface 342 of the outermost ringed ridge 338" of the central dome portion 330 may be outwardly flared and form an angle 4423 with the central axis 334 of the weld face 314 that ranges from 10° to 60°.

Figure 10:
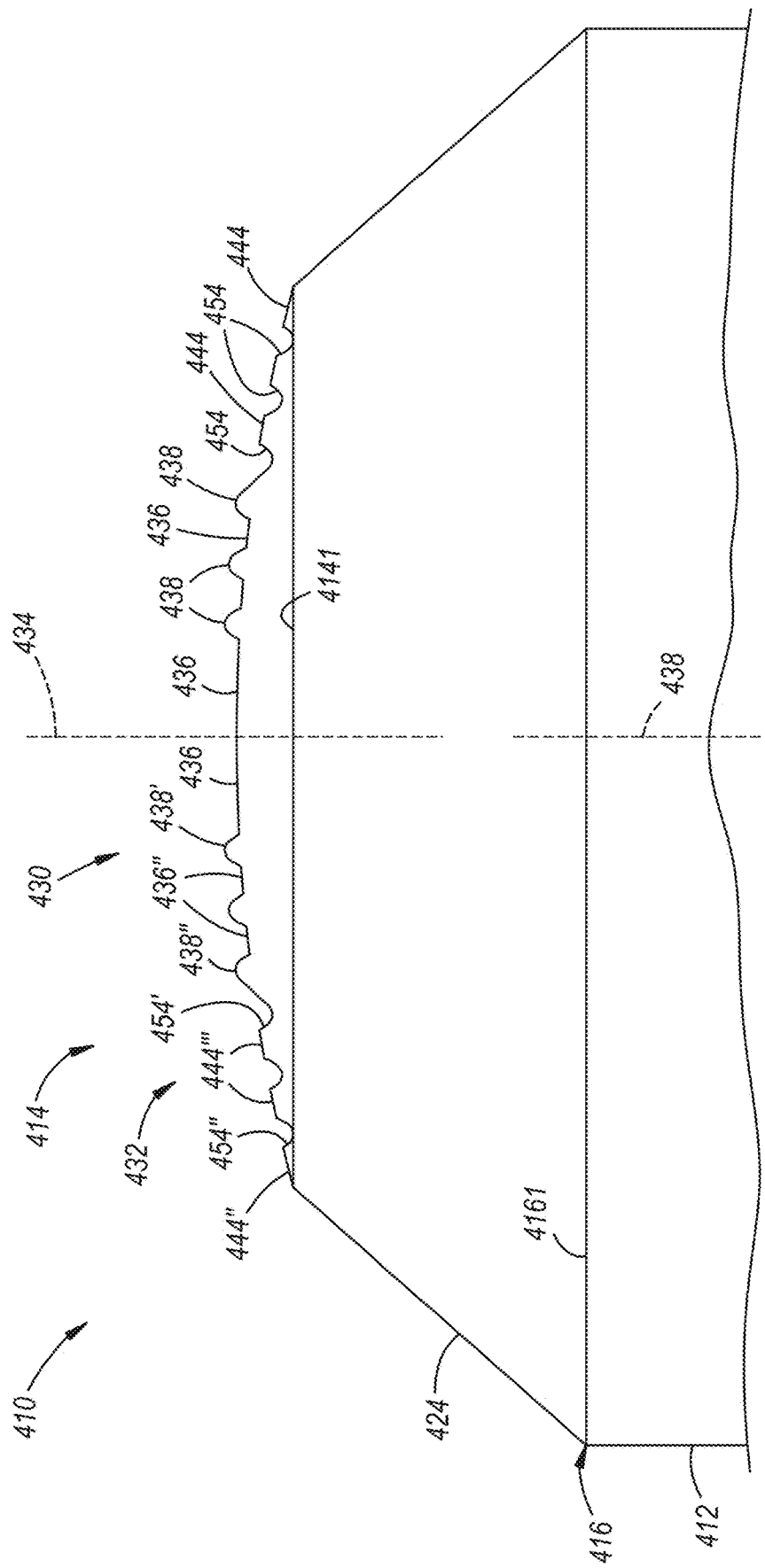
FIG. 10 is a partial cross-sectional view of a welding electrode according to yet another embodiment of the disclosure.

Another embodiment of the disclosed welding electrode is depicted in FIG. 10. The welding electrode illustrated in FIG. 10 is identified by reference numeral 410 and is similar in many respects to the welding electrode 310 shown in FIGS. 7-9. In FIG. 10, reference numerals that correspond to the previously-described welding electrode 310 are used to designate corresponding structural features. The use of corresponding reference numerals is intended to incorporate the earlier discussion of those structural features as if fully recited herein as modified by any additional description that may be provided. As such, when discussing FIG. 10, only the material structural differences of the welding electrodes 410 will be discussed as compared to the welding electrode 310 shown in FIG. 7 and described above. Turning now to FIG. 10, the welding electrode 410 includes one or more ringed grooves 454 on the shoulder portion 432, in the form of a series of such grooves 454, with each of the ringed grooves 454 intruding inwardly into the base shoulder surface 444 and having a closed circumference that surrounds the central dome portion 430 of the weld face 414. In this particular embodiment, however, the base shoulder surface 444 of the shoulder portion 432 is not depressed below the base dome face surface 436 of the central portion; rather, the base shoulder surface 444 and the base dome face surface 436 are aligned and have the same convex dome shape such as, for example a spherically shape with a radius of curvature that ranges from of 10 mm to 100 mm or, more narrowly, from 20 mm to 50 mm.

The welding electrodes 10, 110, 210, 310, 410 described above can be used in a wide variety of resistance spot welding operations in conjunction with stack-ups containing similar or dissimilar metal workpieces. For instance, any of the welding electrodes 10, 110, 210, 310, 410 described above plus other variations not expressly shown and described may be used in conjunction with another spot welding electrode having a similar or dissimilar electrode construction to spot weld a workpiece stack-up that includes at least an aluminum workpiece and an overlapping and adjacent steel workpiece, as will be described in more detail below with reference to FIGS. 11-17. The welding electrodes 10, 110, 210, 310, 410 are operable to spot weld a "2T" workpiece stack-up (FIGS. 11-12) that includes only the adjacent and overlapping pair of aluminum and steel workpieces. The welding electrodes 10, 110, 210, 310, 410 are also operable to spot weld a "3T" workpiece stack-up (FIGS. 13-14) that includes the adjacent and overlapping pair of aluminum and steel workpieces plus an additional aluminum workpiece or an additional steel workpiece so long as the two workpieces of the same base metal composition are disposed next to each other (e.g., aluminum-aluminum-steel or aluminum-steel-steel). The welding electrodes 10, 110, 210, 310, 410 may even be used to spot weld "4T" workpiece stack-ups (e.g., aluminum-aluminum-steel-steel, aluminum-aluminum-aluminum-steel, or aluminum-steel-steel-steel).

Resistance spot welding an aluminum workpiece and a steel workpiece presents some notable challenges due to the materially different properties of the dissimilar workpieces. Specifically, the aluminum workpiece typically includes a refractory oxide surface layer that is difficult to breakdown and disintegrate, which results in an oxide film residue being present at the faying interface of the workpiece during current flow that hinders the ability of the molten aluminum weld pool created within the aluminum workpiece to wet the steel workpiece and may also contribute to near-interface defects. Moreover, the steel workpiece is more thermally and electrically resistive than the aluminum workpiece, meaning that the steel workpiece acts as a heat source and the aluminum workpiece acts as a heat conductor. The resultant heat imbalance established between the workpieces during and just after the cessation of current flow has a tendency to drive the weld defects, such as porosity and micro-cracks, towards and along a bonding interface of the weld joint and the steel workpiece, and also contributes to the formation and growth of a brittle Fe—Al intermetallic layer contiguous with the steel workpiece. The challenges attendant in forming a weld joint between the aluminum and steel workpieces are further complicated when an intermediate organic material layer is disposed between the faying surfaces of the overlapping workpieces.

Additionally, it has been found that the HAZ that surrounds the weld joint within the aluminum workpiece may be age hardened when subjected to high temperatures such as, for example, those encountered during the baking process used to cure applied paint coatings. To be sure, when painting a vehicle, a number of coatings (e.g., zinc phosphate coating or zirconium oxide coating, E-coating, primers, basecoats, clearcoats, etc.) may be applied to an otherwise assembled vehicle body that may incorporate a number of weld joints formed between an aluminum workpiece and a steel workpiece by resistance spot welding. The vehicle may be conveyed through one or more baking ovens such as an ELPO bake oven and a topcoat oven to cure the applied coatings at temperatures that may range from 160° C. to 190° C. The HAZ surrounding the weld joints that bond together an aluminum workpiece and a steel workpiece may be susceptible to a strong hardening response when subjected to such a baking process, which may cause the Vickers hardness (HV) of the HAZ to exceed 90 HV or even 100 HV compared to a hardness of between 60 HV and 70 HV for the nugget portion of the weld joint. When the HAZ is hardened to this extent, cracks that initiate and propagate along the faying interface cannot grow into the hardened aluminum of the HAZ. The cracks therefore bypass the HAZ and grow into the intermetallic layer of the weld joint when the joint is subjected to loading. This is undesirable since the intermetallic layer of the weld joint is harder, more brittle, and less tough than the much larger aluminum weld nugget portion of the joint.

The welding electrodes 10, 110, 210, 310, 410 of the present disclosure are designed to address each of the various issues just mentioned. Indeed, the radially-spaced ringed ridges 38, 138, 238, 338, 438 on the central dome portion 30, 130, 230, 330, 430 of the weld face 14, 114, 214, 314, 414 serve to initially establish good mechanical and electrical contact with the aluminum workpiece by stressing and fracturing the mechanically tough and electrically insulating refractory oxide surface layer that is typically present in an aluminum workpiece under the relatively high pressures imposed on the welding electrodes 10, 110, 210, 310, 410. The radially-spaced ringed surface features 48 (52, 152, 354, 454) on the shoulder portion 32, 132, 332, 432 of the weld face 14, 114, 314, 414 may also assist in this regard if present. Moreover, because the radial outer surface 42, 142, 242, 342, 442 of the outermost ringed ridge 38", 138", 238", 338", 438" of the central dome portion 30, 130, 230, 330, 430 extends downwardly below the base dome face surface 36, 136, 236, 336, 436 to the shoulder portion 32, 132, 232, 332, 432 of the weld face 14, 114, 214, 314, 414—either to the base shoulder surface 44, 144, 244 that is depressed below the base dome face surface 36, 136, 236 or into a groove 354, 454 on the shoulder portion 332, 432 that is adjacent to the central dome portion 330, 430—a thermal treatment within the aluminum workpiece is induced that limits the subsequent hardening of the HAZ and creates a "hinge effect" that deflects cracks initiated at the notch root up into the softer and tougher weld nugget portion of the weld joint away from the faying interface and the intermetallic layer. None of the structural features mentioned above render the welding electrodes 10, 110, 210, 310, 410 incapable of being pressed against or passing current through the steel workpiece.

Referring now to FIGS. 11-17, a welding electrode 610 may be used to resistance spot weld a workpiece stack-up 60 that comprises at least an aluminum workpiece 62 and a steel workpiece 64 that overlap and lie adjacent to one another at a weld location 66. The welding electrode denoted by reference numeral 610 is generically illustrated for simplicity, but is intended to encompass and refer to each of the welding electrodes 10, 110, 210, 310, 410 described above as well as variations not described, and the various structural features of the electrode 610 are likewise identified by corresponding 600 series reference numerals. The welding electrode 610 can be used with a wide variety of workpiece stack-up configurations that include the adjacent pair of aluminum and steel workpieces 62, 64. The workpiece stack-up 60 may, for example, include only the aluminum workpiece 62 and the steel workpiece 64 as far as the number of workpieces are concerned, or it may include an additional aluminum workpiece or an additional steel workpiece so long as the two workpieces of the same base metal composition are disposed next to each other in the stack-up 60. The workpiece stack-up 60 may even include more than three metal workpieces such as an aluminum-aluminum-steel-steel stack-up, an aluminum-aluminum-aluminum-steel stack-up, or an aluminum-steel-steel-steel stack-up. The aluminum and steel workpieces 62, 64 may be worked or deformed before or after being assembled into the workpiece stack-up 60 depending on the part being manufactured and the specifics of the overall manufacturing process.

Figure 11:
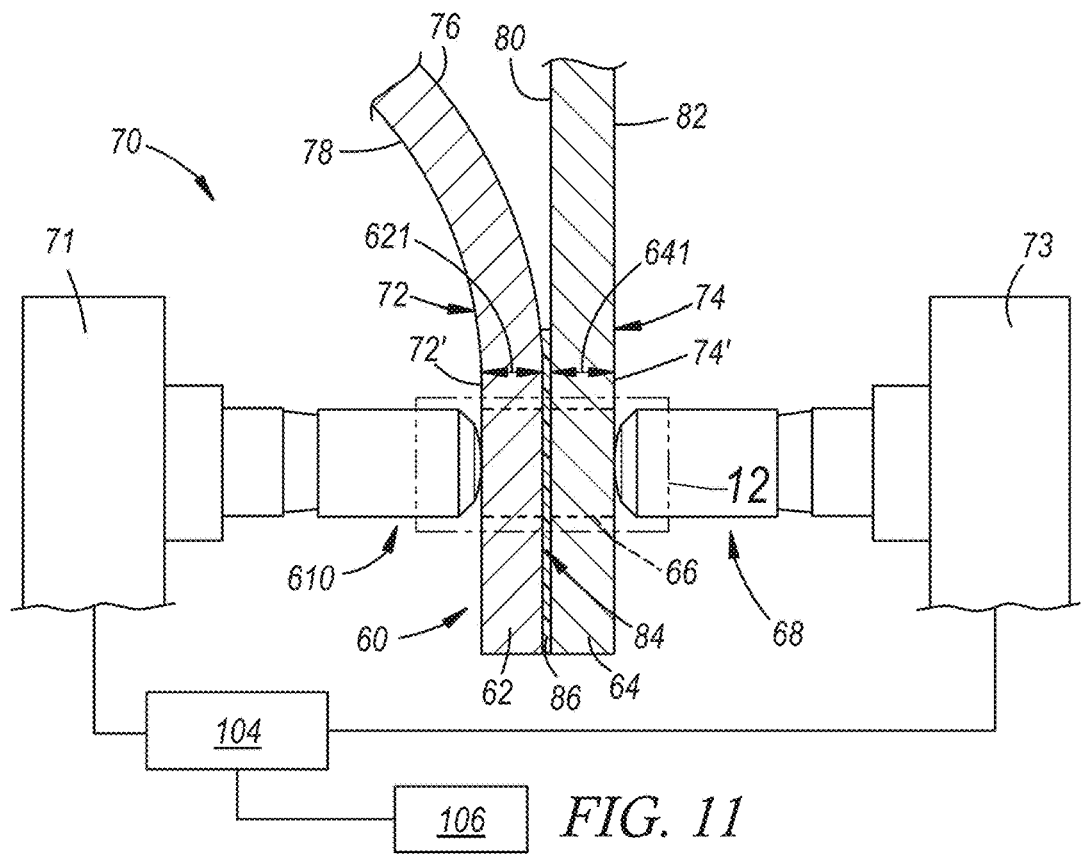
FIG. 11 is general cross-sectional view of one embodiment of a workpiece stack-up situated between a set of opposed welding electrodes in preparation for resistance spot welding, wherein the workpiece stack-up includes an aluminum workpiece and an adjacent overlapping steel workpiece along with an optional intermediate organic material layer disposed between the two workpieces, and wherein at least the welding electrode arranged for pressed contact with the aluminum workpiece surface of the stack-up is constructed according to teachings of the present disclosure.

The workpiece stack-up 60 is illustrated in FIG. 11 along with the welding electrode 610 described above (hereafter referred to as the "first welding electrode 610") and a second welding electrode 68 that are mechanically and electrically configured on a weld gun 70 (partially shown). The workpiece stack-up 60 has a first side 72 provided by an aluminum workpiece surface 72' and a second side 74 provided by a steel workpiece surface 74'. The two sides 72, 74 of the workpiece stack-up 60 are accessible to the set of first and second welding electrodes 610, 68, respectively, at the weld location 66; that is, the first welding electrode 610 is arranged to make contact with and be pressed against the first side 72 of the workpiece stack-up 60 while the second welding electrode 68 is arranged to make contact with and be pressed against the second side 74 of the workpiece stack-up 60. And while only one weld location 66 is depicted in the figures, skilled artisans will appreciate that spot welding may be practiced according to the disclosed method at multiple different weld locations 66 within the same stack-up 60.

The aluminum workpiece 62 includes an aluminum substrate that is either coated or uncoated. The aluminum substrate may be composed of unalloyed aluminum or an aluminum alloy that includes at least 85 wt % aluminum. Some notable aluminum alloys that may constitute the coated or uncoated aluminum substrate are an aluminum-magnesium alloy, an aluminum-silicon alloy, an aluminum-magnesium-silicon alloy, and an aluminum-zinc alloy. If coated, the aluminum substrate may include a surface layer comprised of a refractory oxide material such as a native oxide coating that forms naturally when the aluminum substrate is exposed to air and/or an oxide layer created during exposure of the aluminum substrate to elevated temperatures during manufacture, e.g., a mill scale. The refractory oxide material is typically comprised of aluminum oxide compounds and possibly other oxide compounds as well, such as magnesium oxide compounds if, for example, the aluminum substrate is an aluminum-magnesium alloy. The aluminum substrate may also be coated with a layer of zinc, tin, or a metal oxide conversion coating comprised of oxides of titanium, zirconium, chromium, or silicon, as described in US Pat. Pub. No. 2014/0360986. The surface layer may have a thickness ranging from 1 nm to 10 μm depending on its composition and may be present on each side of the aluminum substrate. Taking into account the thickness of the aluminum substrate and any surface layer that may be present, the aluminum workpiece 62 has a thickness 621 that ranges from 0.3 mm to about 6.0 mm, or more narrowly from 0.5 mm to 3.0 mm, at least at the weld location 66.

The aluminum substrate of the aluminum workpiece 62 may be provided in wrought or cast form. For example, the aluminum substrate may be composed of a 4xxx, 5xxx, 6xxx, or 7xxx series wrought aluminum alloy sheet layer, extrusion, forging, or other worked article. Alternatively, the aluminum substrate may be composed of a 4xx.x, 5xx.x, or 7xx.x series aluminum alloy casting. Some more specific kinds of aluminum alloys that may constitute the aluminum substrate include, but are not limited to, AA5754 and AA5182 aluminum-magnesium alloy, AA6111 and AA6022 aluminum-magnesium-silicon alloy, AA7003 and AA7055 aluminum-zinc alloy, and Al-10Si—Mg aluminum die casting alloy. The aluminum substrate may further be employed in a variety of tempers including annealed (O), strain hardened (H), and solution heat treated (T), if desired. The term "aluminum workpiece" as used herein thus encompasses unalloyed aluminum and a wide variety of aluminum alloys, whether coated or uncoated, in different spot-weldable forms including wrought sheet layers, extrusions, forgings, etc., as well as castings.

The steel workpiece 64 includes a steel substrate from any of a wide variety of strengths and grades that is either coated or uncoated. The steel substrate may be hot-rolled or cold-rolled and may be composed of steel such as mild steel, interstitial-free (IF) steel, bake-hardenable steel, high-strength low-alloy (HSLA) steel, dual-phase (DP) steel, complex-phase (CP) steel, martensitic (MART) steel, transformation induced plasticity (TRIP) steel, twining induced plasticity (TWIP) steel, and boron steel such as when the steel workpiece 64 includes press-hardened steel (PHS). Preferred compositions of the steel substrate, however, include mild steel, dual phase steel, and boron steel used in the manufacture of press-hardened steel. Those three types of steel have ultimate tensile strengths that, respectively, may range from 150 MPa to 500 MPa, from 500 MPa to 1100 MPa, and from 1200 MPa to 1800 MPa. The steel workpiece 64 may include a surface layer on one side or both sides of the steel substrate. If coated, the steel substrate preferably includes a surface layer of zinc (e.g., hot-dip galvanized), a zinc-iron alloy (e.g., galvanneal or electrodeposited), a zinc-nickel alloy (e.g., electrodeposited), nickel, aluminum, an aluminum-magnesium alloy, an aluminum-zinc alloy, or an aluminum-silicon alloy, any of which may have a thickness of up to 50 μm on each side of the steel substrate. Taking into account the thickness of the steel substrate and any surface layer that may be present, the steel workpiece 64 has a thickness 641 that ranges from 0.3 mm and 6.0 mm, or more narrowly from 0.6 mm to 2.5 mm, at least at the weld location 66.

Figure 12:
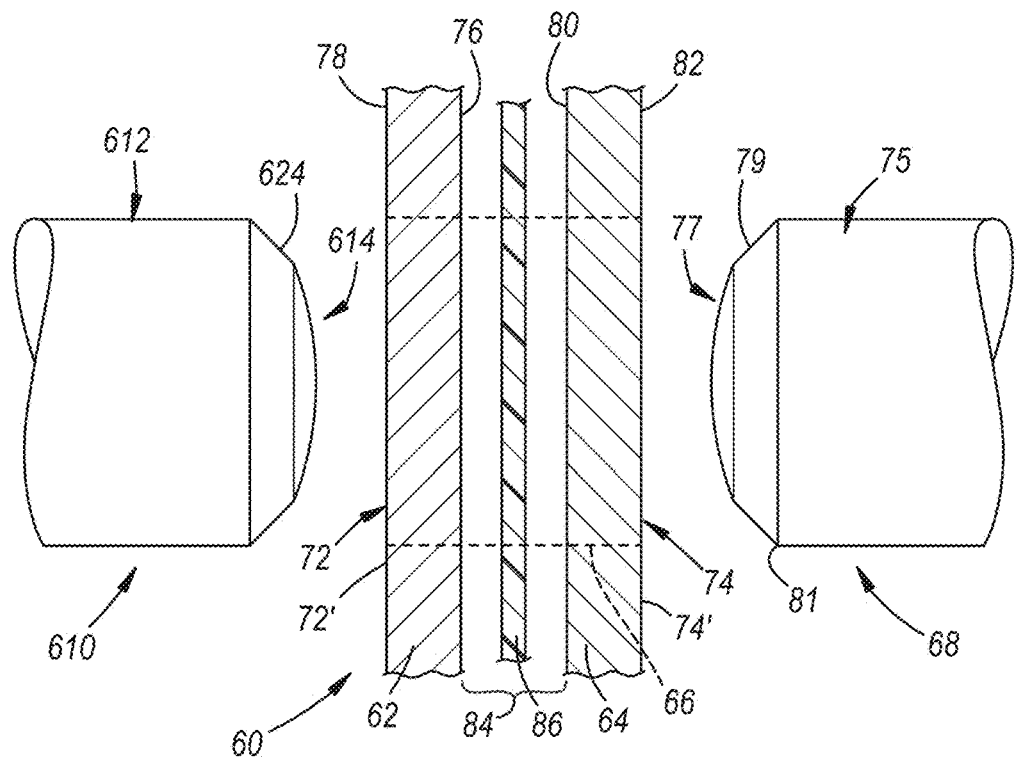
FIG. 12 is an exploded view of the workpiece stack-up and portions of the set of opposed welding electrodes shown in FIG. 11.

When the two workpieces 62, 64 are stacked-up for spot welding in the context of a "2T" stack-up embodiment, which is illustrated in FIGS. 11-12, the aluminum workpiece 62 and the steel workpiece 64 present the first and second sides 72, 74 of the workpiece stack-up 60, respectively. In particular, the aluminum workpiece 62 includes a faying surface 76 and a back surface 78 and, likewise, the steel workpiece 64 includes a faying surface 80 and a back surface 82. The faying surfaces 76, 80 of the two workpieces 62, 64 overlap and confront one another to establish a faying interface 84 that extends through the weld location 66 and which may optionally encompass an intermediate organic material layer 86 applied between the faying surfaces 76, 80. The back surfaces 78, 82 of the aluminum and steel workpieces 62, 64, on the other hand, face away from one another in opposite directions at the weld location 66 and constitute, respectively, the aluminum workpiece surface 72' and the steel workpiece surface 74' of the first and second sides 72, 74 of the workpiece stack-up 60.

The intermediate organic material layer 86 that may be present between the faying surfaces 76, 80 of the aluminum and steel workpieces 62, 64 may be an adhesive layer that includes a structural thermosetting adhesive matrix. The structural thermosetting adhesive matrix may be any curable structural adhesive including, for example, as a heat-curable epoxy or a heat-curable polyurethane. Some specific examples of heat-curable structural adhesives that may be used as the thermosetting adhesive matrix include DOW Betamate 1486, Henkel Terokal 5089, and Uniseal 2343, all of which are commercially available. Additionally, the adhesive layer may further include optional filler particles, such as silica particles, dispersed throughout the thermosetting adhesive matrix to modify the viscosity or other mechanical properties of the adhesive layer for manufacturing operations. In addition to an adhesive layer, the intervening organic material layer 86 may include other organic material layers such as a sound-proofing layer or an organic sealer, to name but a few other possibilities.

The term "faying interface 84" is thus used broadly in the present disclosure and is intended to encompass any overlapping and confronting relationship between the faying surfaces 76, 80 of the workpieces 62, 64 in which resistance spot welding can be practiced. The faying surfaces 76, 80 may, for example, be in direct contact with each other such that they physically abut and are not separated by a discrete intervening material layer (i.e., the intervening organic material layer 86 is not present). As another example, the faying surfaces 76, 80 may be in indirect contact with each other such as when they are separated by the intervening organic material layer 86—and thus do not experience the type of interfacial physical abutment found in direct contact—yet are in close enough proximity to each other that resistance spot welding can still be practiced. This type of indirect contact between the faying surfaces 76, 80 of the aluminum and steel workpieces 62, 64 typically results when the intermediate organic material layer 86 is applied between the faying surfaces 76, 80 to a thickness at least within the weld location 66 that ranges from 0.1 mm to 2.0 mm or, more narrowly, from 0.2 mm to 1.0 mm.

Figure 13:
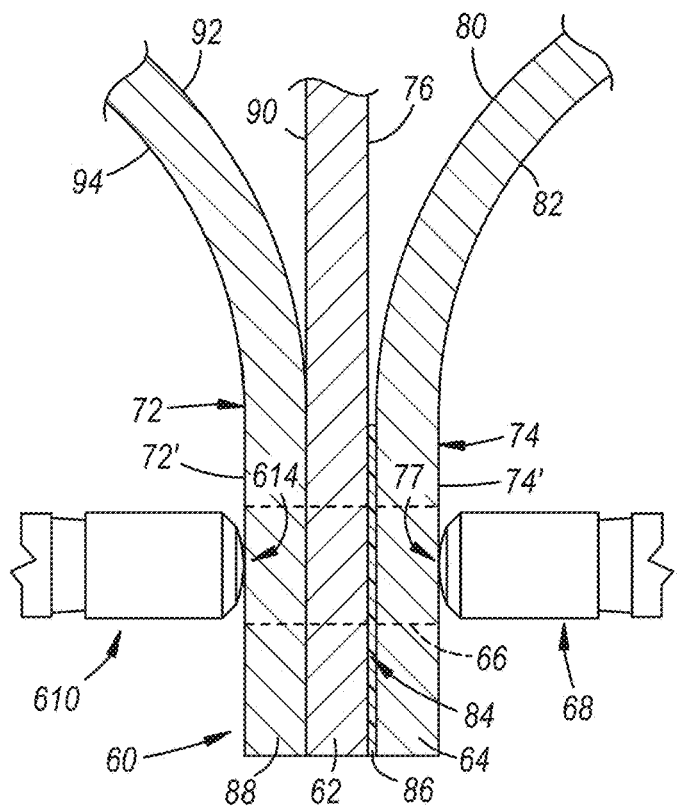
FIG. 13 is a general cross-sectional view of another embodiment of a workpiece stack-up situated between a set of opposed welding electrodes in preparation for resistance spot welding, wherein at least the welding electrode arranged for pressed contact with the aluminum workpiece surface of the stack-up is constructed according to teachings of the present disclosure, and wherein the workpiece stack-up includes an aluminum workpiece and an adjacent overlapping steel workpiece along with an intermediate organic material layer disposed between the two workpieces, and further includes an additional aluminum workpiece (i.e., two aluminum workpieces and one steel workpiece)
Figure 14:
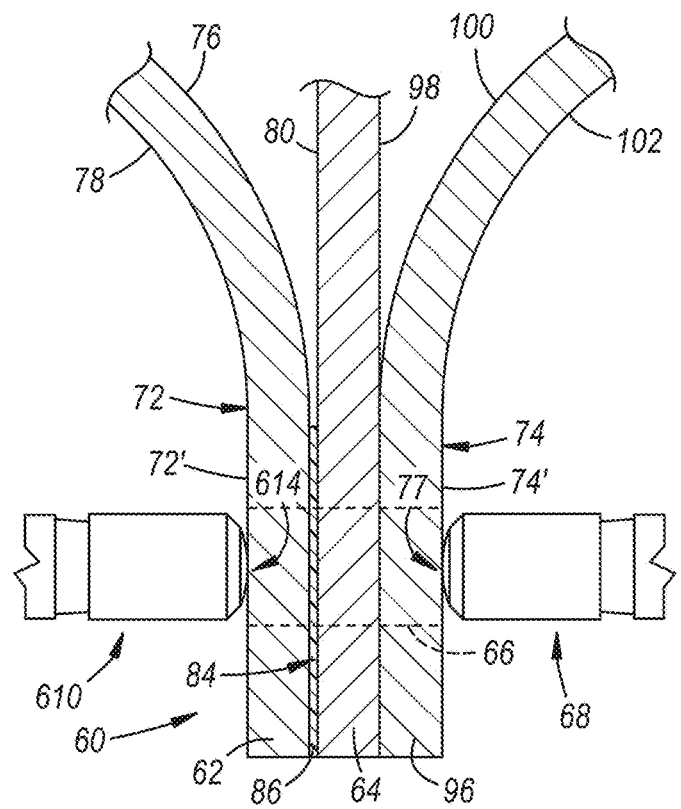
FIG. 14 is a general cross-sectional view of another embodiment of a workpiece stack-up situated between a set of opposed welding electrodes in preparation for resistance spot welding, wherein at least the welding electrode arranged for pressed contact with the aluminum workpiece surface of the stack-up is constructed according to teachings of the present disclosure, and wherein the workpiece stack-up includes an aluminum workpiece and an adjacent overlapping steel workpiece along with an intermediate organic material layer disposed between the two workpieces, and further includes an additional steel workpiece (i.e., two steel workpieces and one aluminum workpiece)

Of course, as shown in FIGS. 13-14, the workpiece stack-up 60 is not limited to the inclusion of only the aluminum workpiece 62 and the adjacent steel workpiece 64 as far as the number of workpieces are concerned. The workpiece stack-up 60 may also include at least an additional aluminum workpiece or an additional steel workpiece—in addition to the adjacent aluminum and steel workpieces 62, 64—so long as the additional workpiece is disposed adjacent to the workpiece 62, 64 of the same base metal composition; that is, any additional aluminum workpiece is disposed adjacent to the aluminum workpiece 62 opposite the faying interface 84 and any additional steel workpiece is disposed adjacent to the steel workpiece 64 opposite the faying interface 84. As for the characteristics of the additional workpiece(s), the descriptions of the aluminum workpiece 62 and the steel workpiece 64 provided above are applicable to any additional aluminum or any additional steel workpiece that may be included in the workpiece stack-up 60. It should be noted, though, that while the same general descriptions apply, there is no requirement that the additional aluminum workpiece(s) and/or the additional steel workpiece(s) be identical in terms of composition, thickness, or form (e.g., wrought or cast) to the aluminum workpiece 62 and the steel workpiece 64, respectively, that lie next to each other within the workpiece stack-up 60.

As shown in FIG. 13, for example, the workpiece stack-up 60 may include the adjacent aluminum and steel workpieces 62, 64 described above along with an additional aluminum workpiece 88. Here, as shown, the additional aluminum workpiece 88 overlaps the adjacent aluminum and steel workpieces 62, 64 and lies next to the aluminum workpiece 62. When the additional aluminum workpiece 88 is so positioned, the back surface 82 of the steel workpiece 64 constitutes the steel workpiece surface 74' that provides the second side 74 of the workpiece stack-up 60, as before, while the aluminum workpiece 62 that lies adjacent to the steel workpiece 64 now includes a pair of opposed faying surfaces 76, 90. The faying surface 76 of the aluminum workpiece 62 that faces the faying surface 80 of the steel workpiece 64 continues to establish the faying interface 84 between the two workpieces 62, 64 as previously described. The other faying surface 90 of the aluminum workpiece 62 overlaps and confronts a faying surface 92 of the additional aluminum workpiece 88. As such, in this particular arrangement of lapped workpieces 88, 62, 64, a back surface 94 of the additional aluminum workpiece 88 now constitutes the aluminum workpiece surface 72' that provides the first side 72 of the workpiece stack-up 60.

In another example, as shown in FIG. 14, the workpiece stack-up 60 may include the adjacent aluminum and steel workpieces 62, 64 described above along with an additional steel workpiece 96. Here, as shown, the additional steel workpiece 96 overlaps the adjacent aluminum and steel workpieces 62, 64 and lies next to the steel workpiece 64. When the additional steel workpiece 96 is so positioned, the back surface 78 of the aluminum workpiece 62 constitutes the aluminum workpiece surface 72' that provides the first side 72 of the workpiece stack-up 60, as before, while the steel workpiece 64 that lies adjacent to the aluminum workpiece 62 now includes a pair of opposed faying surfaces 80, 98. The faying surface 80 of the steel workpiece 64 that faces the faying surface 76 of the aluminum workpiece 62 continues to establish the faying interface 84 between the two workpieces 62, 64 as previously described. The other faying surface 98 of the steel workpiece 64 overlaps and confronts a faying surface 100 of the additional steel workpiece 96. As such, in this particular arrangement of lapped workpieces 62, 64, 96, a back surface 102 of the additional steel workpiece 96 now constitutes the steel workpiece surface 74' that provides the second side 74 of the workpiece stack-up 60.

Returning now to FIG. 11, the first welding electrode 610 and the second welding electrode 68 are used to pass electrical current through the workpiece stack-up 60 and across the faying interface 84 of the adjacent aluminum and steel workpieces 62, 64 at the weld location 66 regardless of whether an additional aluminum and/or steel workpiece is present. Each of the welding electrodes 610, 68 is carried by the weld gun 70, which may be of any suitable type including a C-type or an X-type weld gun. The spot welding operation may call for the weld gun 70 to be mounted to a robot capable of moving the weld gun 70 around the workpiece stack-up 60 as needed, or it may call for the weld gun 70 to be configured as a stationary pedestal-type in which the workpiece stack-up 60 is manipulated and moved relative to the weld gun 70. Additionally, as illustrated schematically here, the weld gun 70 may be associated with a power supply 104 that delivers electrical current between the welding electrodes 610, 68 according to a programmed weld schedule administered by a weld controller 106. The weld gun 70 may also be fitted with coolant lines and associated control equipment in order to deliver a coolant fluid, such as water, to each of the welding electrodes 610, 68 to help control the temperatures of the welding electrodes 610, 68 during current flow.

The weld gun 70 includes a first gun arm 71 and a second gun arm 73. The first gun arm 71 secures and retains the first welding electrode 610 and the second gun arm 73 secures and retains the second welding electrode 68. In terms of their positioning relative to the workpiece stack-up 60, the first welding electrode 610 is positioned for contact with the first side 72 of the stack-up 60, and, consequently, the second welding electrode 68 is positioned for contact with the second side 74 of the stack-up 70. The first and second weld gun arms 71, 73 are operable to converge or pinch the welding electrodes 610, 68 towards each other and to impose a clamping force on the workpiece stack-up 60 at the weld location 66 once the electrodes 610, 68 are brought into contact with their respective workpiece stack-up sides 72, 74. The power supply 104 that delivers electrical current for passage between the first and second welding electrodes 610, 68 during spot welding of the workpiece stack-up 60 is preferably a medium-frequency direct current (MFDC) inverter power supply that electrically communicates with the spot welding electrodes 610, 68. Other types of power supplies may certainly be used to conduct the disclosed method despite not being expressly identified here. The power supply 104 may be configured to pass direct current (DC) between the welding electrodes 610, 68 at current levels up to 50 kA in accordance with a programmed weld schedule.

The second welding electrode 68 employed opposite the first welding electrode 610 can be any of a wide variety of electrode designs. In general, and referring back to FIGS. 11-12, the second welding electrode 68 includes an electrode body 75, a weld face 77, and optionally a transition nose 79 that serves to upwardly displace the weld face 77 from a front end 81 of the electrode body 75. The weld face 77 is the portion of the second welding electrode 68 that makes contact with the second side 74 of the workpiece stack-up 60 opposite the weld face 614 of the first welding electrode 610 during spot welding. At least the weld face 77 of the second welding electrode 68, and preferably the entire spot welding electrode 68 including the electrode body 75, the weld face 77, and the transition nose 79, if present, is constructed from a material having an electrical conductivity of at least 70% IACS, or more preferably at least 90% IACS, and a thermal conductivity of at least 300 W/mK. Some materials that meet these criteria include a C15000 copper-zirconium (CuZr) alloy, a C18200 copper-chromium (CuCr) alloy, a C18150 copper-chromium-zirconium (CuCrZr) alloy, and a dispersion-strengthened copper material such as copper with an aluminum oxide dispersion. Other materials not expressly listed here that meet the applicable electrical and thermal conductivity standards may also be used as well.

In a preferred embodiment, the second welding electrode 68 is constructed similarly to the first welding electrode 610 and, accordingly, the description above regarding the first welding electrode 610 and the contents of FIGS. 1-10 are equally applicable here. In other words, the structure of the electrode body 75, the weld face 77, and the optional transition nose 79 of the second welding electrode 68 has the same structural features and is consistent with the discussion above regarding the structure of the electrode body 12, 112, 212, 312, 412, the weld face 14, 114, 214, 314, 414, and the optional transition nose 24, 124, 224, 324, 424 of the first welding electrode 10, 110, 210, 310, 410. And while the second welding electrode 68 can have a similar structure to the first welding electrode 10, 110, 210, 310, 410, the first and second welding electrodes 610, 68 do not necessarily have to be identical and indistinguishable in every facet. To be sure, the first and second welding electrodes 610, 68 can share a similar structure while still exhibiting some structural distinctions that fall within the permitted numerical variances detailed herein.

A resistance spot welding method will now be described with reference to FIGS. 11 and 15-17, which depict only the aluminum and steel workpieces 62, 64 that overlap and lie adjacent to one another to establish the faying interface 84. The presence of additional workpieces in the workpiece stack-up 60 including, for example, the additional aluminum or steel workpieces 62, 64 described above, does not affect how the spot welding method is carried out or have any substantial effect on the joining mechanism that takes place at the faying interface 84 of the adjacent aluminum and steel workpieces 62, 64. The more-detailed discussion provided below thus applies equally to instances in which the workpiece stack-up 60 is a "3T" stack-up that includes the additional aluminum workpiece 88 (FIG. 13) or the additional steel workpiece 96 (FIG. 14), as well as "4T" stack-ups, despite the fact that those additional workpieces are not illustrated in FIGS. 11 and 15-17. Skilled artisans will appreciate how to adjust the described method if needed to accommodate the presence of any extra aluminum and/or steel workpieces.

The disclosed welding method involves first assembling, if needed, the workpiece stack-up 60 including the pair of adjacent aluminum and steel workpieces 62, 64 together with the optional intermediate organic material layer 86 that extends through the weld location 66 over a broader joining region. Suitable fixturing equipment may be used to bring the aluminum and steel workpieces 62, 64 together and to hold them in place. Once assembled, the workpiece stack-up 60 is positioned between the first welding electrode 610 and the opposed second welding electrode 68. The weld face 614 of the first welding electrode 610 is positioned to contact the aluminum workpiece surface 72' of the first side 72 of the workpiece stack-up 60 and the weld face 77 of the second welding electrode 68 is positioned to contact the steel workpiece surface 74' of the second side 74 of the stack-up 60. The weld gun 70 is then operated to converge the first and second welding electrodes 610, 68 relative to one another so that their respective weld faces 614, 77 are pressed against the opposite first and second sides 72, 74 of the stack-up 60 at the weld location 66. The weld faces 614, 77 are typically facially aligned with each other at the weld location 66 under a clamping force imposed on the workpiece stack-up 60 that ranges from 400 lb (pounds force) to 2000 lb or, more narrowly, from 600 lb to 1300 lb.

As a function of at least the geometry of the weld face 614 of the first welding electrode 610, the pressure exerted by the first welding electrode 610 is initially concentrated and directed through the radially-spaced ringed ridges 38, 138, 238, 338, 438 on the central dome portion 30, 130, 230, 330, 430 onto a corresponding limited area of the first side 72 of the workpiece stack-up 60. The focused direction of the clamping pressure through a limited area stresses and distorts the faying surfaces 76, 80 of the aluminum and steel workpieces 62, 64 together at the middle of the weld location 66 and, furthermore, drives lateral displacement of the intermediate organic material layer 86, if present, along the faying interface 84. By initially promoting lateral displacement of the intermediate organic material layer 86 (if present), substantially all of the organic material is cleared from at least a centermost region of the weld location 66, which may be between 2 mm and 6 mm in diameter, leaving behind only minimal organic material of less than 0.1 mm in thickness, if any. As such, only a very small amount of organic material, if any, may remain at the faying interface 84 when current flow is commenced, which minimizes the possibility that thermal decomposition products (e.g., carbon ash, filler particles, etc.) may be produced near the faying surface 80 of the steel workpiece 64 and eventually contribute to the formation of near-interface defects in the weld joint.

Figure 15:
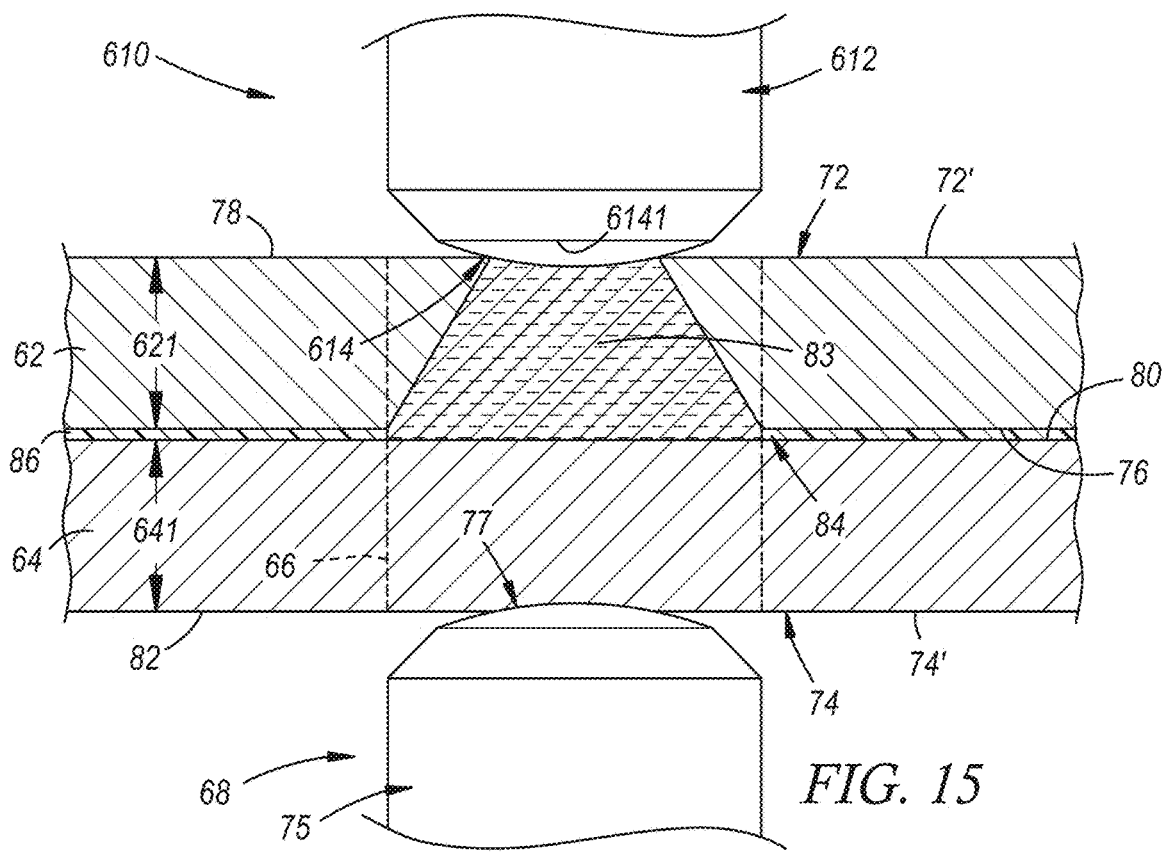
FIG. 15 is a general view of the workpiece stack-up (in cross-section) and the set of opposed first and second welding electrodes during passage of electrical current between the first and second weld faces of the welding electrodes and through the stack-up, which occurs after the stack-up is initially clamped between the welding electrodes at the weld location, and wherein the passage of electrical current causes melting of the aluminum workpiece that lies adjacent to the steel workpiece and the creation of a molten aluminum weld pool within the aluminum workpiece.
Figure 16:
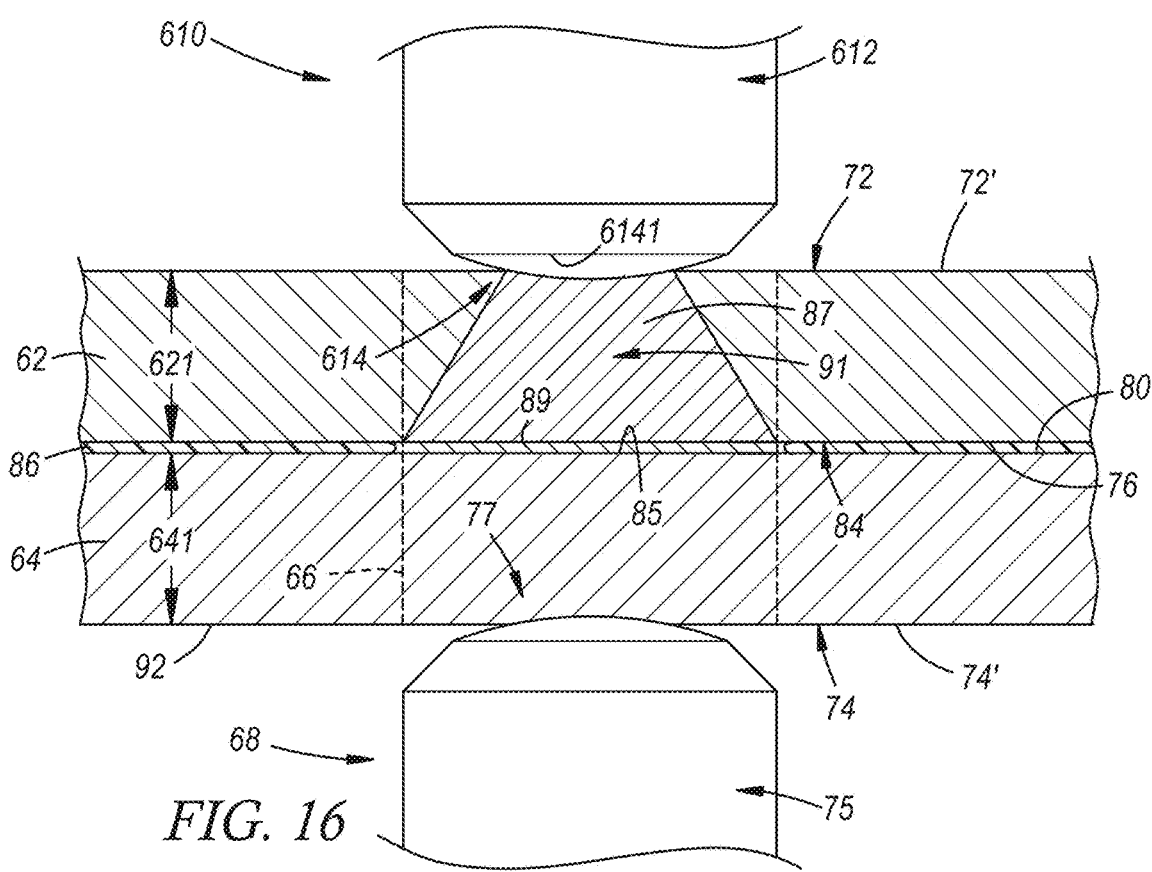
FIG. 16 is a general view of the workpiece stack-up (in cross-section) and the set of opposed first and second welding electrodes after passage of electrical current between the first and second weld faces of the electrodes and through the stack-up has ceased, thus allowing the molten aluminum weld pool to solidify into a weld joint that weld bonds the pair of adjacent aluminum and steel workpieces together.

After the welding electrodes 610, 68 are pressed against their respective sides 72, 74 of the workpiece stack-up 60, an electrical current is passed between the facially aligned weld faces 614, 77 of the first and second welding electrodes 610, 68 to form a weld joint 91 (FIG. 16). The exchanged electrical current may be constant or pulsed over time, or some combination of the two, and typically has a current level that ranges from 5 kA rms (root mean squared) and 50 kA rms and lasts for a total duration of 50 ms to 5000 ms or, more narrowly, for a total duration of 200 ms to 2000 ms. As a few specific examples, the schedule of the applied electrical current may be in the nature of the multi-step weld schedule disclosed in US2015/0053655 or US2017/0106466, the entire contents of each of those applications being incorporated herein by reference, or another weld schedule that is suitable for the workpiece stack-up 60. Referring now to FIG. 15, the electrical current flowing between the first and second welding electrodes 610, 68 heats the more electrically- and thermally-resistive steel workpiece 64 quite rapidly. This heat is transferred to the aluminum workpiece 62 and causes the aluminum workpiece 62 to begin to melt within the weld location 66. The melting of the aluminum workpiece 62 creates a molten aluminum weld pool 83. The molten aluminum weld pool 83 is contained within the aluminum workpiece 62 and wets the adjacent faying surface 80 of the steel workpiece 64.

During the period of time in which the molten aluminum weld pool 83 is growing within the aluminum workpiece 62 to is final size, the weld face 614 of the first welding electrode 610 impresses further into the first side 72 of the workpiece stack-up 60, which successively brings more of the weld face 614 into pressed contact with the first side 72. The continued impression of the weld face 614 of the first welding electrode 610 eventually contains the molten aluminum weld pool 83 within the outer circumference 6141 of the weld face 614. The molten aluminum weld pool 83 may have a diameter along the faying surface 80 of the steel workpiece 64 that ranges from 3 mm to 15 mm, or more narrowly from 6 mm to 12 mm, and may penetrate a distance into the aluminum workpiece 62 that ranges from 10% to 100% of the thickness 621 of the aluminum workpiece 62 at the weld location 66. And, in terms of its composition, the molten aluminum weld pool 83 is composed predominantly of aluminum material derived from the aluminum workpiece 62.

The passage of the electrical current between the weld faces 614, 77 of the first and second welding electrodes 610, 68 is eventually terminated, which drops current flow to below 1 kA as some inductance may still be present in the system, thereby allowing the molten aluminum weld pool 83 to solidify into the weld joint 91 as depicted in FIG. 16. The weld joint 91 is the material that weld bonds the adjacent aluminum and steel workpieces 62, 64 together. In particular, the weld joint 91 establishes a bonding interface 85 with the faying surface 80 of the steel workpiece 64 and includes two main components: (1) an aluminum weld nugget 87 and (2) a Fe—Al intermetallic layer 89. The aluminum weld nugget 87 is comprised of resolidified aluminum and extends into the aluminum workpiece 62 to a distance that ranges from 10% to 100%, or more narrowly from 20% to 80%, of the thickness 621 of the aluminum workpiece 62 at the weld location 66. The Fe—Al intermetallic layer 89 is situated between the aluminum weld nugget 87 and the faying surface 80 of the steel workpiece 64 and is contiguous with the bonding interface 85. The Fe—Al intermetallic layer 89 is produced due to a reaction between the molten aluminum weld pool 83 and iron that diffuses into the weld pool 83 from the steel workpiece 64 at spot welding temperatures and often has an average thickness of 1 μm to 7 μm along the bonding interface 85 of the weld joint 91 and the steel workpiece 64. Intermetallic compounds such as $FeAl_3$ compounds, $Fe_2Al_5$ compounds, and possibly other Fe—Al intermetallic compounds may be found in the intermetallic layer 89. And, as previously mentioned, the Fe—Al intermetallic layer 89 is harder, more brittle, and less tough than the aluminum weld nugget 87.

After the spot welding method is completed, and the weld joint 91 is formed so as to weld bond the aluminum and steel workpieces 62, 64 together, the clamping force imposed on the workpiece stack-up 60 at the weld location 66 is relieved and the first and second welding electrodes 610, 68 are retracted away from their respective workpiece sides 72, 74. The workpiece stack-up 60 may now be moved relative to the weld gun 70 so that the first and second welding electrodes 610, 68 are positioned in facing alignment at another weld location 66 where the spot welding method is repeated. Once the desired number of weld joints 91 has been formed on the workpiece stack-up 60, the stack-up 60 may be subject to further processing including being painted. In that regard, the paint bake operations that accompany the painting process are less liable to influence and decrease the strength and other mechanical properties of the weld joint 91 because the use of the particular weld face geometry described above (e.g., weld faces 14, 114, 214, 314, 414) on at least the first welding electrode 610 and, if desired, on the second welding electrode 68, creates a hinge effect within the aluminum workpiece 62 around the weld joint 91 through a combination of HAZ softening from thermal exposure and weld joint geometry that acts to deflect cracks that have been initiated at the notch root up into the softer weld nugget 87 of the weld joint 91 and away from the harder, less tough, and more brittle intermetallic layer 89 when the welded stack-up is subject to certain types of loading.

Figure 6:
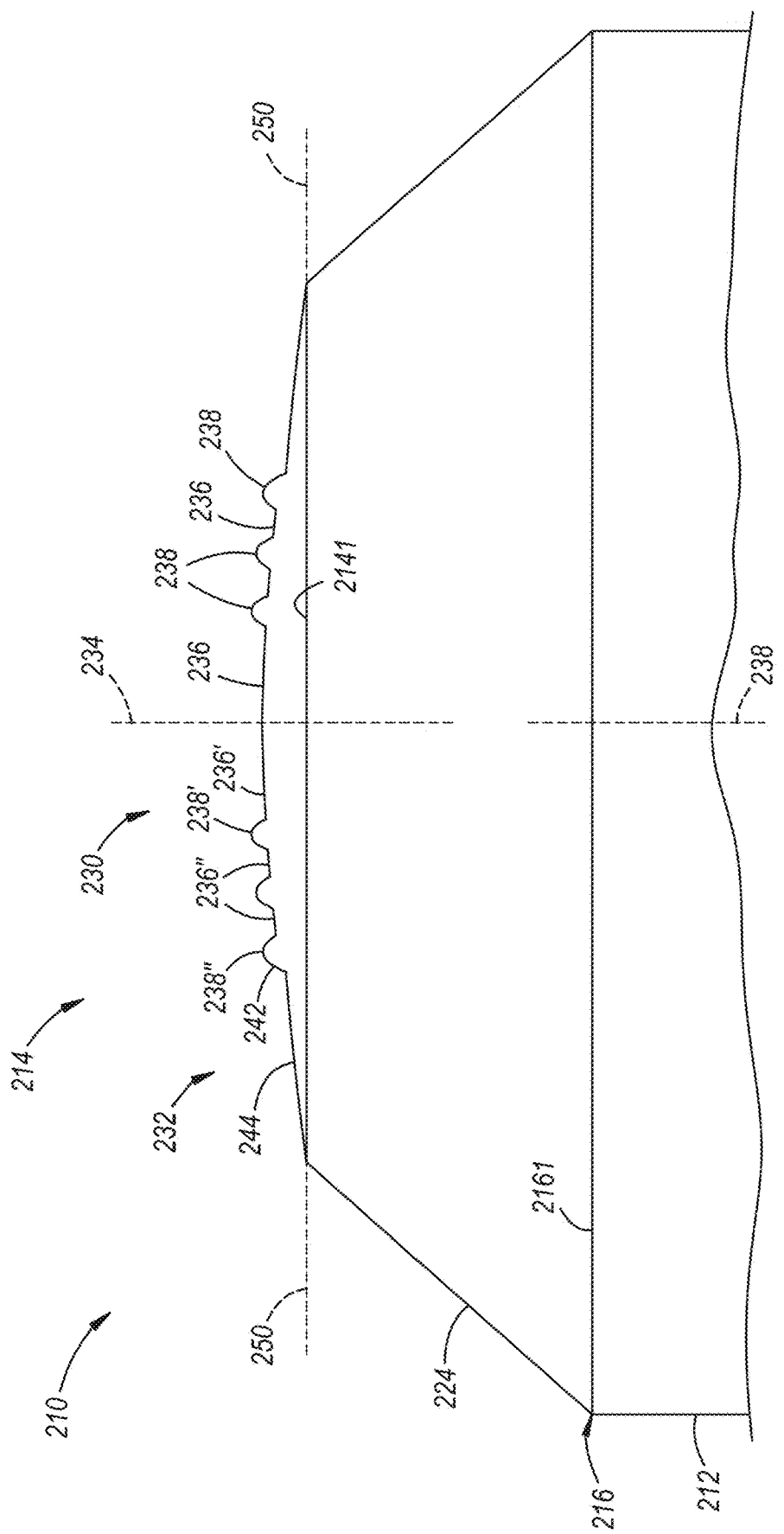
FIG. 6 is a partial cross-sectional view of a welding electrode according to yet another embodiment of the disclosure.
Figure 17:
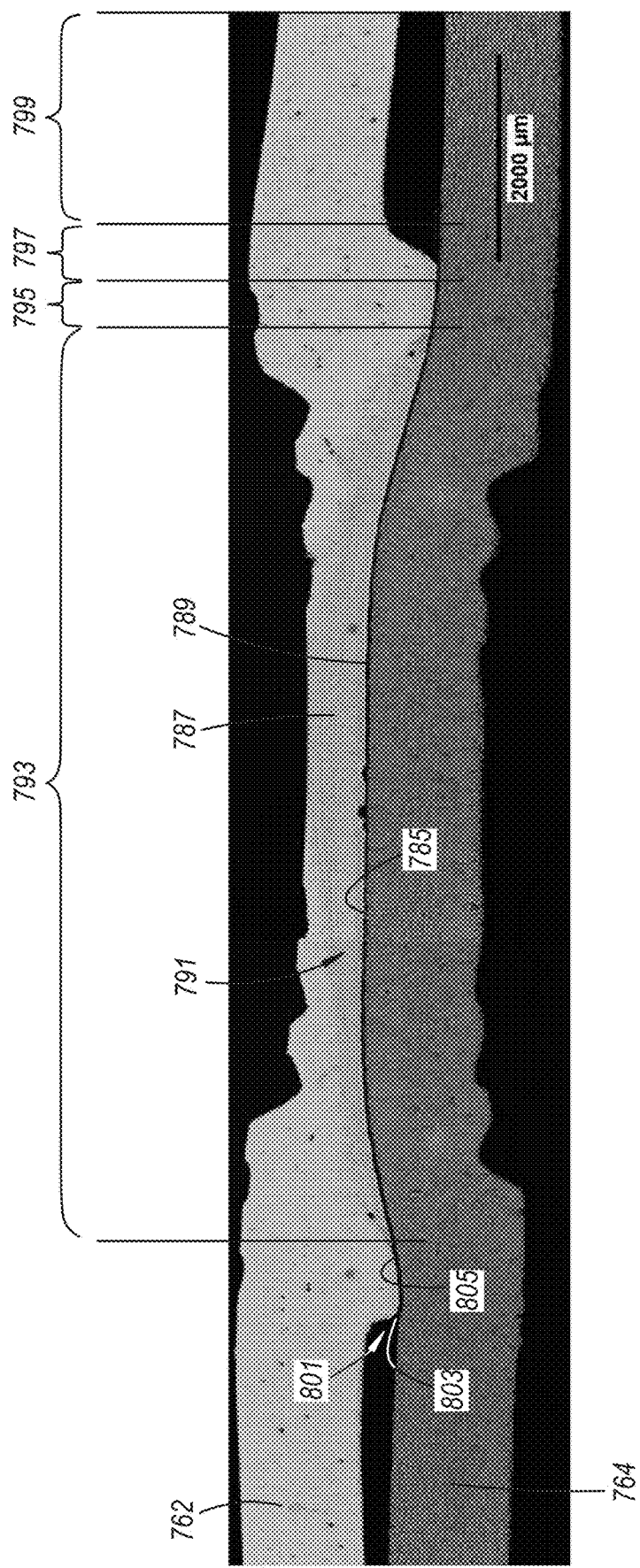
FIG. 17 is a photomicrograph showing, in cross-section, a weld joint formed between an aluminum workpiece and a steel workpiece and, further, representatively demonstrating a hinge effect that has been created within the aluminum workpiece by practices of the present disclosure.

The hinge effect that is created through use of the weld face geometry in conjunction with at least the first welding electrode 610 is described and explained in connection with FIG. 17. Here, a workpiece stack-up 760 is shown in which an aluminum workpiece 762 and a steel workpiece 764 are weld bonded together by a weld joint 791. A welding electrode having the construction of the first welding electrode 610 as described above has been used in conjunction with another welding electrode to form the weld joint 791. Specifically, the welding electrode that has been pressed into the aluminum workpiece 762 had the construction of the first welding electrode 610. The "hinge effect" has been created as a result of engaging that particular welding electrode with the aluminum workpiece 762 and, in particular, is a consequence of the weld face geometry in which the outermost ringed ridge 38", 138", 238", 338", 438" on the central dome portion 30, 130, 230, 330, 430 is located radially inwardly of either a ringed groove 354 (FIGS. 7-9), 454 (FIG. 10) or a depressed base shoulder surface 44' (FIGS. 1-4), 144' (FIG. 5), 244 (FIG. 6). The hinge effect improves the mechanical performance of the weld joint 791, especially when tensile or peel loading is applied, and is characterized by mechanical, thermal, and/or metallurgical variations within the aluminum workpiece 762 that surround the weld joint 791 and encourage crack initiation and deflection within the aluminum workpiece 762 and into the aluminum weld nugget 787 of the weld joint 791 as opposed to propagating into and through the intermetallic layer 789.

For example, when the aluminum workpiece 762 is composed of a heat-treatable aluminum alloy, the hinge effect is characterized by a series of zones that respond differently to subsequent paint bake operations. A first zone 793 contains the aluminum weld nugget 787. The aluminum weld nugget 787 has a completely remelted microstructure that is soft (~60-70 HV), stable, and unresponsive to heat treatment. Just outside the perimeter of the first zone 793 is a second zone 795 that has achieved temperatures near the melting point of the aluminum alloy. The exposure to elevated temperatures allows solute elements to dissolve within the aluminum alloy that then precipitate during baking to significantly increase the hardness (80 to 120 Hv) of the alloy. Beyond the second zone 795 is a third zone 797. This zone 797 is also exposed to elevated temperatures from the creation of the weld joint 791 and is heated sufficiently to precipitate solute elements and coarsen them such that they are stable within the aluminum alloy. The aluminum alloy within the third zone 797 is less responsive to heat treatment and is softer (60 to 80 Hv) than the alloy in the second zone 795 around the weld joint 791. Finally, beyond the third zone 797 is a fourth zone 799 where the aluminum alloy is left relatively unaffected by the welding process and can continue precipitation hardening during heat treatment (80 to 120 Hv). The creation of the soft third zone 797 around the weld joint 791 encourages deformation of the aluminum workpiece 762 under load such that cracking occurs preferably in the aluminum workpiece 762 as opposed to along the intermetallic layer 789 or nearby oxide film defects at the bonding interface 785.

While the thermal and metallurgical variations are limited to heat-treatable aluminum alloys, the mechanical variations associated with the hinge effect apply to both heat-treatable and non-heat treatable aluminum alloys and are related to the abrupt change in thickness of the aluminum workpiece 762—which corresponds to the location of the outermost ringed ridge 38", 138", 238", 338", 438" on the central dome portion 30, 130, 230, 330, 430—and where this occurs in relation to the weld joint 791 and notch root geometry. The hinge effect increases stress in the aluminum workpiece 762 and provides an easier crack path through the aluminum workpiece 762 that prevents crack growth along the bonding interface 785. For the hinge effect to be most effective, it needs to be located near the path of a growing crack. Cracks in the weld joint 791 typically start from a notch root 801 that includes a notch root opening 803 between the workpieces 762, 764 and a notch root slit 805 adjacent to the perimeter of the weld joint 791. Cracks begin at the notch root slit 805 and can grow along the bonding interface 785 if there is a thick intermetallic layer 789 or weld defects along the bonding interface 785 for the cracks to follow. As soon as a crack starts to grow along the bonding interface 785, it encounters the soft, solidified aluminum weld nugget 787 where, if the aluminum workpiece 762 is allowed to bend or deform from the presence of a combination of hardness profile (soft region) and joint geometry (stress concentration), it will deflect into the aluminum weld nugget 787. Once the crack deflects into the aluminum weld nugget 787 it can grow towards the sheet surface and away from the bonding interface 785.

The "hinge effect" is thus an imposed condition within the aluminum workpiece 762, whether it be a soft zone located between hard zones or an abrupt change in thickness, that allows the aluminum workpiece 762 to experience a bending moment when loaded, particularly when tensile or peel loading is applied. This bending moment resembles a hinge movement and, essentially, protects the bonding interface 785 from crack growth. The proper location of the hinge effect encourages such crack deflection. Locating the hinge effect within the notch root opening 803 and, preferably, within the notch root slit 805 will provide the best opportunity for cracks to deflect into the aluminum weld nugget 787. Additional improvement in mechanical performance is obtained with the hinge effect by the increased deformation of the steel workpiece 764 that increases the angle of the bonding interface 785 adjacent to the notch root slit 805 and thereby improves the opportunity for crack deflection into and through the aluminum weld nugget 787. The location of the hinge effect and the increased deformation of the steel workpiece 764 can be controlled by the positioning of the outermost ringed ridge 38", 138", 238", 338", 438" of the central dome portion 30, 130, 230, 330, 430 on the weld face 14, 114, 214, 314, 414.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

What is claimed is:

1. A welding electrode comprising:
a body having a front end and an opposite back end; and
a weld face supported on the front end of the body, the weld face comprising a central dome portion and a shoulder portion that surrounds the central dome portion and extends from an outer circumference of the weld face upwardly and radially inwardly to the central dome portion, the central dome portion having a base dome face surface and a series of radially-spaced ringed ridges, each of the series of radially-spaced ringed ridges on the central dome portion projecting outwardly from the base dome face surface and surrounding a central axis of the weld face, the series of radially-spaced ringed ridges on the central dome portion including an innermost ringed ridge that is closest to the central axis of the weld face and an outermost ringed ridge that is farthest from the central axis of the weld face such that the series of radially-spaced ringed ridges on the central dome portion increases in plan diameter from the innermost ringed ridge to the outermost ringed ridge, the outermost ringed ridge on the central dome portion having a radial inner side surface and a radial outer side surface, the radial outer side surface of the outermost ringed ridge on the central dome portion extending below the base dome face surface down to the shoulder portion of the weld face.

2. The welding electrode set forth in claim 1, wherein the central dome portion has a plan diameter that ranges from 3 mm to 12 mm.

3. The welding electrode set forth in claim 2, wherein the base dome face surface is spherically shaped and has a radius of curvature that ranges from 10 mm to 100 mm.

4. The welding electrode set forth in claim 1, wherein each of the series of radially-spaced ringed ridges on the central dome portion projects outwardly from the base dome face surface to a ridge height that ranges from 20 µm to 500 µm.

5. The welding electrode set forth in claim 1, wherein the series of radially-spaced ringed ridges on the central dome portion comprises between two and five ringed ridges.

6. The welding electrode set forth in claim 1, wherein the shoulder portion has a base shoulder surface and one or more ringed surface features, each of which intrudes inwardly into or projects outwardly from the base shoulder surface, respectively, and surrounds the central dome portion.

7. The welding electrode set forth in claim 1, wherein the shoulder portion has a base shoulder surface that is depressed below the base dome face surface of the central dome portion.

8. The welding electrode set forth in claim 7, wherein the base shoulder surface is free of protruding ringed ridges and intruding ringed grooves and extends from the outer circumference of the weld face to the radial outer side surface of the outermost ringed ridge of the central dome portion.

9. The welding electrode set forth in claim 8, wherein the base shoulder surface is spherically rounded and has a radius of curvature that ranges from 10 mm to 100 mm.

10. The welding electrode set forth in claim 7, wherein the shoulder portion includes a series of radially-spaced ringed ridges positioned between a radial outboard portion of the base shoulder surface located adjacent to the outer circumference of the weld face and a radial inboard portion of the base shoulder surface located adjacent to and contiguous with the radial outer side surface of the outermost ringed ridge of the central dome portion, each of the series of radially-spaced ringed ridges on the shoulder portion projecting outwardly from the base shoulder surface and surrounding the central dome portion, the series of radially-spaced ringed ridges on the shoulder portion including an innermost ringed ridge that is closest to the central dome portion and an outermost ringed ridge that is farthest from the central dome portion, the series of radially-spaced ringed ridges on the shoulder portion being separated by intervening portions of the base shoulder surface and increasing in plan diameter from the innermost ringed ridge to the outermost ringed ridge on the shoulder portion.

11. The welding electrode set forth in claim 10, wherein each of the series of radially-spaced ringed ridges on the shoulder portion projects outwardly from the base shoulder surface to a ridge height that ranges from 20 µm to 500 µm, and wherein the series of radially-spaced ringed ridges on the shoulder portion comprises between two and six ringed ridges.

12. The welding electrode set forth in claim 7, wherein the shoulder portion includes a series of radially-spaced ringed grooves, each of the series of radially-spaced ringed grooves on the shoulder portion intruding inwardly into the base shoulder surface and surrounding the central dome portion, the series of radially-spaced ringed grooves on the shoulder portion including an innermost ringed groove that is closest to the central dome portion and an outermost ringed groove that is farthest from the central dome portion, the innermost ringed groove being adjacent to the central dome portion and partially defined by the radial outer side surface of the outermost ringed ridge of the central dome portion, the outermost ringed groove being adjacent to a radial outboard portion of the base shoulder surface that extends radially inwardly from the outer circumference of the weld face to the outermost ringed groove on the shoulder portion, and the series of radially-spaced ringed grooves on the shoulder portion being separated by intervening portions of the base shoulder surface and increasing in plan diameter from the innermost ringed groove to the outermost ringed groove on the shoulder portion.

13. The welding electrode set forth in claim 12, wherein each of the series of radially-spaced ringed grooves on the shoulder portion intrudes inwardly into the base shoulder surface to a groove depth that ranges from 20 µm to 500 µm, and wherein the series of radially-spaced ringed grooves on the shoulder portion comprises between two and six ringed grooves.

14. The welding electrode set forth in claim 7, wherein the base shoulder surface of the shoulder portion is depressed below the base dome face surface of the central dome portion by distance that ranges from 0.05 mm to 1.0 mm.

15. The welding electrode set forth in claim 1, wherein the shoulder portion includes a base shoulder surface that is not depressed below the base dome face surface of the central dome portion and further includes a series of radially-spaced ringed grooves, each of the series of radially-spaced ringed grooves on the shoulder portion intruding inwardly into the base shoulder surface and surrounding the central dome portion, the series of radially-spaced ringed grooves on the shoulder portion including an innermost ringed groove that is closest to the central dome portion and an outermost ringed groove that is farthest from the central dome portion, the innermost ringed groove being adjacent to the central dome portion and partially defined by the radial outer side surface of the outermost ringed ridge of the central dome portion, the outermost ringed groove being adjacent to a radial outboard portion of the base shoulder surface that extends radially inwardly from the outer circumference of the weld face to the outermost ringed groove on the shoulder portion, and the series of radially-spaced ringed grooves on the shoulder portion being separated by intervening portions of the base shoulder surface and increasing in plan diameter from the innermost ringed groove to the outermost ringed groove on the shoulder portion.

16. The welding electrode set forth in claim 15, wherein each of the series of radially-spaced ringed grooves on the shoulder portion intrudes inwardly into the base shoulder surface to a groove depth that ranges from 20 μm to 500 μm, and wherein the series of radially-spaced ringed grooves on the shoulder portion comprises between two and six ringed grooves.

17. A method of resistance spot welding using the welding electrode set forth in claim 1 as a first welding electrode, the method comprising:
   providing a workpiece stack-up that includes an aluminum workpiece and a steel workpiece that overlaps with the aluminum workpiece to establish a faying interface between the aluminum and steel workpieces, the workpiece stack-up having an aluminum workpiece surface that provides a first side of the stack-up and a steel workpiece surface that provides an opposed second side of the stack-up;
   positioning the workpiece stack-up between a weld face of the first welding electrode and a weld face of a second welding electrode;
   pressing the weld face of the first welding electrode against the first side of the workpiece stack-up and pressing the weld face of the second welding electrode against the second side of the workpiece stack-up in facial alignment with the weld face of the first welding electrode at a weld location; and
   passing an electrical current momentarily between the weld face of the first welding electrode and the weld face of the second welding electrode, and through the workpiece stack-up, to grow a molten aluminum weld pool within the aluminum workpiece that wets an adjacent faying surface of the steel workpiece, wherein the molten aluminum weld pool solidifies into a weld joint upon cessation of passage of the electrical current.

18. A welding electrode comprising:
   a body having a front end and an opposite back end; and
   a weld face supported on the front end of the body, the weld face comprising a central dome portion and a shoulder portion that surrounds the central dome portion and extends from an outer circumference of the weld face upwardly and radially inwardly to the central dome portion;
   wherein the central dome portion has a base dome face surface and a series of radially-spaced ringed ridges, each of the series of radially-spaced ringed ridges on the central dome portion projecting outwardly from the base dome face surface and surrounding a central axis of the weld face, the series of radially-spaced ringed ridges on the central dome portion including an innermost ringed ridge that is closest to the central axis of the weld face and an outermost ringed ridge that is farthest from the central axis of the weld face such that the series of radially-spaced ringed ridges on the central dome portion increases in plan diameter from the innermost ringed ridge to the outermost ringed ridge, the outermost ringed ridge on the central dome portion having a radial inner side surface and a radial outer side surface, the radial outer side surface of the outermost ringed ridge on the central dome portion extending below the base dome face surface down to the shoulder portion and having a height that is greater than a height of the radial inner side surface;
   wherein the shoulder portion has a base shoulder surface and includes one or more ringed surface features, each of which intrudes inwardly into or projects outwardly from the base shoulder surface, respectively, and surrounds the central dome portion.

19. The welding electrode set forth in claim 18, wherein the one or more ringed surface features includes a groove that intrudes inwardly into the base shoulder surface and is adjacent to the central dome portion and partially defined by the radial outer side surface of the outermost ringed ridge of the central dome portion.

20. The welding electrode set forth in claim 18, wherein the base shoulder surface is depressed below the base dome face surface of the central dome portion and includes a radial inboard portion that is located adjacent to and contiguous with the radial outer side surface of the outermost ringed ridge of the central dome portion, and wherein the one or more ringed surface features includes a ringed ridge that projects outwardly from the base shoulder surface of the shoulder portion.

* * * * *